(12) United States Patent
Chang et al.

(10) Patent No.: US 6,604,136 B1
(45) Date of Patent: Aug. 5, 2003

(54) APPLICATION PROGRAMMING INTERFACES AND METHODS ENABLING A HOST TO INTERFACE WITH A NETWORK PROCESSOR

(75) Inventors: Chi-Hua Chang, Milpitas, CA (US); Man Dieu Trinh, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/337,025

(22) Filed: Jun. 25, 1999

Related U.S. Application Data
(60) Provisional application No. 60/090,939, filed on Jun. 27, 1998.

(51) Int. Cl.[7] .................... G06F 15/173; G06F 15/16
(52) U.S. Cl. ................................. 709/223; 709/229
(58) Field of Search .................. 709/223, 229, 709/250

(56) References Cited

U.S. PATENT DOCUMENTS

| | | | |
|---|---|---|---|
| 4,024,507 A | | 5/1977 | Berkling et al. |
| 4,586,134 A | * | 4/1986 | Norstedt ............ 709/228 |
| 4,700,294 A | | 10/1987 | Haynes |
| 5,218,687 A | | 6/1993 | Ducuosso et al. |
| 5,287,537 A | | 2/1994 | Newmark et al. |
| 5,295,135 A | | 3/1994 | Kammerl |
| 5,379,297 A | | 1/1995 | Glover et al. |
| 5,394,402 A | | 2/1995 | Ross |
| 5,414,707 A | | 5/1995 | Johnston et al. |
| 5,481,536 A | | 1/1996 | Reisch et al. |
| 5,515,370 A | | 5/1996 | Rau |
| 5,517,488 A | | 5/1996 | Miyazaki et al. |
| 5,535,201 A | | 7/1996 | Zheng |

(List continued on next page.)

OTHER PUBLICATIONS

"ATM Internetworking", Cisco System, Inc., Copyright May 1995, pp. 25–49.

Passmore, Et Al., "The Virtual Lan Technology Report", Decisys, Inc., Copyright 1996, pp. 1–20.

"Lan Emulation Over ATM Version 2–LUNI Specification", The ATM Forum, Technical Committee, AF–LANE–0084.000, Jul. 1997, pp. 24–27 and p. 92.

Ghani et al., "Hierarchical Scheduling for Integrated ABR/VBR Services in ATM Networks," Globecom '97, IEEE Global Telecommunications Conference; pp. 779–784.

Lin, Dong Constant–time Dynamic ATM Bandwidth Scheduling for Guaranteed and Best Effort Services with Overbooking: IEEE Infocom '97; pp. 398–405.

Chiussi et al., "Virtual Queuing Techniques for ABR Service: Improving ABR/VBR Interaction," IEEE Infocom '97; pp. 406–418.

Benmohamed et al., "A Control–Theoretic ABR Explicit Rate Algorithm for ATM Switches with PER–VC Queuing", IEEE Infocom '98; pp. 183–191.

*Primary Examiner*—Krisna Lim
(74) *Attorney, Agent, or Firm*—Blakely, Sokoloff, Taylor & Zafman LLP

(57) ABSTRACT

The present invention provides application programming interfaces (APIs) which allow a host to control the functioning of a network processor and also perform various network data manipulation functions. The APIs are intended to encapsulate as much as possible the underlying messaging between the host system and the network processor and to hide the low device level command details from the host. The APIs are provided by a program module. A host may invoke an API which is then communicated by the program module to the network processor where functions corresponding to the API are performed. Responses to the APIs may be forwarded back to the host. Asynchronous callback functions, invoked in response to the API calls, may be used to forward responses to the host.

47 Claims, 6 Drawing Sheets

U.S. PATENT DOCUMENTS

| | | | |
|---|---|---|---|
| 5,539,729 | A | 7/1996 | Bodnar |
| 5,555,256 | A | 9/1996 | Calamvokis |
| 5,555,265 | A | 9/1996 | Kakuma et al. |
| 5,564,051 | A * | 10/1996 | Halliwell et al. ........... 707/200 |
| 5,574,875 | A | 11/1996 | Stansfield et al. |
| 5,590,128 | A | 12/1996 | Maloney et al. |
| 5,619,650 | A * | 4/1997 | Bach et al. ................. 370/466 |
| 5,638,371 | A | 6/1997 | Raychaudhuri et al. |
| 5,640,399 | A | 6/1997 | Rostoker et al. |
| 5,652,872 | A | 7/1997 | Richter et al. |
| 5,659,794 | A * | 8/1997 | Caldarale et al. ........... 709/234 |
| 5,664,116 | A | 9/1997 | Gaytan et al. |
| 5,684,797 | A | 11/1997 | Aznar et al. |
| 5,684,954 | A | 11/1997 | Kaiserswerth et al. |
| 5,696,930 | A | 12/1997 | Garetz et al. |
| 5,701,300 | A | 12/1997 | Jeon et al. |
| 5,726,985 | A | 3/1998 | Daniel et al. |
| 5,740,171 | A | 4/1998 | Mazzola et al. |
| 5,742,772 | A | 4/1998 | Sreenan |
| 5,745,477 | A | 4/1998 | Zheng et al. |
| 5,745,790 | A | 4/1998 | Oskouy |
| 5,748,630 | A | 5/1998 | Bergantino et al. |
| 5,751,709 | A | 5/1998 | Rathnavelu |
| 5,751,951 | A | 5/1998 | Osborne et al. |
| 5,751,955 | A | 5/1998 | Sonnier et al. |
| 5,754,530 | A | 5/1998 | Awdeh et al. |
| 5,764,895 | A | 6/1998 | Chung |
| 5,771,231 | A | 6/1998 | Watanabe |
| 5,796,715 | A | 8/1998 | Patterson et al. |
| 5,796,978 | A | 8/1998 | Yoshioka et al. |
| 5,805,805 | A | 9/1998 | Civanlar et al. |
| 5,812,550 | A | 9/1998 | Sohn et al. |
| 5,825,765 | A | 10/1998 | Menzilcioglu et al. |
| 5,835,928 | A | 11/1998 | Auslander et al. |
| 5,841,772 | A | 11/1998 | Daniel et al. |
| 5,848,068 | A | 12/1998 | Daniel et al. |
| 5,857,075 | A | 1/1999 | Chung |
| 5,867,712 | A | 2/1999 | Shaw et al. |
| 5,870,561 | A | 2/1999 | Jarvis et al. |
| 5,875,173 | A | 2/1999 | Ohgane et al. |
| 5,878,232 | A | 3/1999 | Marimuthu |
| 5,905,874 | A | 5/1999 | Johnson |
| 5,909,441 | A | 6/1999 | Alexander, Jr. et al. |
| 5,910,955 | A | 6/1999 | Nishimura et al. |
| 5,912,892 | A | 6/1999 | Barnhart et al. |
| 5,935,249 | A * | 8/1999 | Stern et al. ................. 709/250 |
| 5,943,693 | A | 8/1999 | Barth |
| 5,956,336 | A | 9/1999 | Loschke et al. |
| 5,974,457 | A | 10/1999 | Waclawsky et al. |
| 5,974,462 | A | 10/1999 | Aman et al. |
| 5,978,951 | A | 11/1999 | Lawler et al. |
| 5,983,332 | A | 11/1999 | Watkins |
| 5,991,854 | A | 11/1999 | Watkins |
| 6,003,027 | A | 12/1999 | Prager |
| 6,005,943 | A | 12/1999 | Cohen et al. |
| 6,021,263 | A | 2/2000 | Kujoory et al. |
| 6,058,434 | A * | 2/2000 | Wilt et al. .................. 709/300 |
| 6,041,059 | A | 3/2000 | Joffe et al. |
| 6,052,383 | A | 4/2000 | Stoner et al. |
| 6,073,175 | A | 6/2000 | Tavs et al. |
| 6,085,252 | A | 7/2000 | Zhu et al. |
| 6,104,700 | A | 8/2000 | Haddock et al. |
| 6,119,170 | A * | 9/2000 | Schoffelman et al. ........ 709/213 |
| 6,144,996 | A | 11/2000 | Starnes et al. |
| 6,147,975 | A | 11/2000 | Bowman-Amuah |
| 6,154,776 | A | 11/2000 | Martin |
| 6,163,541 | A | 12/2000 | Casey et al. |
| 6,167,049 | A | 12/2000 | Pei et al. |
| 6,172,991 | B1 | 1/2001 | Mori |
| 6,195,697 | B1 | 2/2001 | Bowman-Amuah |
| 6,198,751 | B1 | 3/2001 | Dorsey et al. |
| 6,201,971 | B1 | 3/2001 | Purnadi et al. |
| 6,223,292 | B1 | 4/2001 | Dean et al. |
| 6,269,396 | B1 * | 7/2001 | Shah et al. ................. 709/223 |
| 6,285,674 | B1 | 9/2001 | Soni et al. |
| 6,285,684 | B1 | 9/2001 | Suzuki et al. |
| 6,311,212 | B1 | 10/2001 | Chong et al. |
| 6,311,238 | B1 * | 10/2001 | Hebert ....................... 370/466 |
| 6,337,863 | B1 | 1/2002 | Nair et al. |
| 6,343,078 | B1 | 1/2002 | Bronstein et al. |
| 6,411,625 | B1 | 6/2002 | Furuhashi et al. |
| 6,425,067 | B1 | 7/2002 | Chong et al. |
| 6,452,923 | B1 | 9/2002 | Gerszberg et al. |

* cited by examiner

APPLICATION PROGRAMMING INTERFACES AND METHODS ENABLING A HOST TO INTERFACE WITH A NETWORK PROCESSOR

CROSS-REFERENCES TO RELATED APPLICATIONS

This application claims priority from U.S. Provisional Patent Application No. 60/090,939, entitled "NETWORK ACCELERATOR SUBSYSTEM BASED ON SINGLE-CHIP NETWORK PROCESSOR AND INTERFACE PROTOCOL," filed Jun. 27, 1998, the entire disclosure of which is herein incorporated by reference for all purposes. This application also claims priority from U.S. patent application Ser. No. 09/271,061, entitled "TWO-DIMENSIONAL QUEUING/DE-QUEUING METHODS AND SYSTEMS FOR IMPLEMENTING THE SAME," filed Mar. 16, 1999, the entire disclosure of which is herein incorporated by reference for all purposes.

The following patent applications, including this one, are being filed concurrently, and the disclosure of each other application is hereby incorporated by reference in its entirety into this application for all purposes:

U.S. patent application Ser. No. 09/344,640, entitled "METHOD AND APPARATUS FOR CONTROLLING A NETWORK PROCESSOR," filed Jun. 25, 1999;

U.S. patent application Ser. No. 09/344,608, entitled "SYSTEM AND METHOD FOR PERFORMING CUT-THROUGH FORWARDING IN AN ATM NETWORK SUPPORTING LAN EMULATION," filed Jun. 25, 1999;

U.S. patent application Ser. No. 09/337,025, entitled "APPLICATION PROGRAMMING INTERFACES AND METHODS ENABLING A HOST TO INTERFACE WITH A NETWORK PROCESSOR," filed Jun. 25, 1999;

U.S. patent application Ser. No. 09/344,820, entitled "CBR/VBR TRAFFIC SCHEDULER," filed Jun. 25, 1999;

U.S. patent application Ser. No. 09/344,672, entitled "MULTI-PROTOCOL CONVERSION ASSISTANCE METHOD AND SYSTEM FOR A NETWORK ACCELERATOR," filed Jun. 25, 1999;

U.S. patent application Ser. No. 09/340,282, entitled "SYSTEMS AND METHODS FOR IMPLEMENTING POINTER MANAGEMENT," filed Jun. 25, 1999;

U.S. patent application Ser. No. 09/340,068, entitled "SYSTEM FOR MULTILAYER BROADBAND PROVISIONING IN COMPUTER NETWORKS," filed Jun. 25, 1999; and U.S. patent application Ser. No. 09/344,453, entitled "NETWORK ACCELERATOR SUBSYSTEM BASED ON SINGLE-CHIP NETWORK PROCESSOR AND INTERFACE PROTOCOL," filed Jun. 25, 1999.

Additionally, the disclosure of each of the following pending patent applications is hereby incorporated by reference in its entirety into this application for all purposes:

U.S. patent application Ser. No. 09/335,223, entitled "SYSTEMS AND METHODS FOR IMPLEMENTING ABR WITH GUARANTEED MCR," filed Jun. 17, 1999; and U.S. patent application Ser. No. 09/270,287, entitled "SYSTEMS AND METHODS FOR ON-CHIP STORAGE OF VIRTUAL CONNECTION DESCRIPTORS," filed Mar. 16, 1999.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the U.S. Patent and Trademark Office patent file or records, but otherwise reserves all copyright rights whatsoever.

BACKGROUND OF THE INVENTION

The present invention is generally related to the networking field and more particularly to techniques for providing application user interfaces (APIs) for controlling the functionality of network processors.

The communication industry has experienced explosive growth stemming from increased demand for information and connectivity by both individual consumers and corporations. Due to the proliferation of the personal computer and the rise of communication networks, such as the Internet, there is an ever increasing need for faster communication between computers using efficient networks. In order to accommodate this explosive growth, carriers and backbone providers are rapidly introducing network infrastructures which offer exponentially more bandwidth and information carrying capacity than in the past.

In order to meet the growing demand for speed and bandwidth, network devices such as client computer systems, servers, hubs, routers, switches, network backbones, network processors, etc., are being forced to offer a wide range of services to meet consumer demands. These network processors have to be capable of supporting a plethora of emerging communication standards, transport protocols, and increased performance requirements. These network processors also have to perform a plurality of tasks such as performing translation between different network standards such as Ethernet and Asynchronous Transfer Mode (ATM), reformatting of data, traffic scheduling, routing of data cells, packets, messages, etc.

Although network processors now provide more services, the success or failure of these network processors depends largely on how easily they can be integrated with and controlled by a host device such as a computer. Due to the differing requirements of host applications, it is desired that the network processors provide facilities to perform control functions and network management functions both at a higher level of control and also at a more granular device level. Further, it is desired that the network processors provide facilities allowing host applications to make full use of the resources and services offered by the various existing and emerging networking standards.

SUMMARY OF THE INVENTION

According to the teachings of the present invention, techniques are provided for controlling a network processor and for facilitating integration of the network processor with a host system or an application executing on the host system. The present invention provides application programming interfaces (APIs) which can be invoked by the host system or the host application for performing functions on the network processor. The APIs provided by the present invention allow a host to efficiently use resources and services offered by the network processor.

According to an aspect of the present invention, upper level APIs are provided which allow a host to control the network processor and also perform various network data manipulation functions. The APIs are intended to encapsulate as much as possible the underlying messaging between the host system and the network processor and to hide the low device level command details from the host. In one embodiment, the APIs may be mapped to one or more device level APIs.

According to another aspect of the present invention, the APIs are provided by a upper level program module. A host may invoke an API which is then communicated by the program module to the network processor where functions corresponding to the API are performed. Responses to the APIs may be forwarded synchronously or asynchronously back to the host. In one embodiment of the present invention, asynchronous callback functions, invoked in response to the API calls are used to forward responses to the host.

According to yet another aspect of the present invention, the APIs allow a host to configure and monitor a network processor in the control plane, and to send or receive network data in the data plane. Examples of APIs include APIs for system initialization and configuration, physical layer hardware management functions, ATM signaling, ILMI and related functions, LANE related functions, bridging functions, system facilities functions, system diagnostics, network management functions, and statistics gathering functions. APIs are also provided for performing functions related to upper layer software protocol stacks such as MPOA protocol stack, LANE protocol stack, and IP over ATM protocol stack.

Other aspects and advantages of the invention will be better understood by reference to the following detailed description and the accompanying figures.

DESCRIPTION OF THE SPECIFIC EMBODIMENTS

According to the present invention, a network processor provides facilities allowing host applications to control the functioning of the network processor. The application programming interfaces (APIs) provided by the network processor allow a host application to control the functioning of the network processor at both a high level and also at a lower device level. The host application is accordingly offered the desired level of control. Further, APIs provided according to the present invention allow host applications to efficiently use resources and services offered by the various existing and emerging networking standards provided by the network processor.

Figure 1:
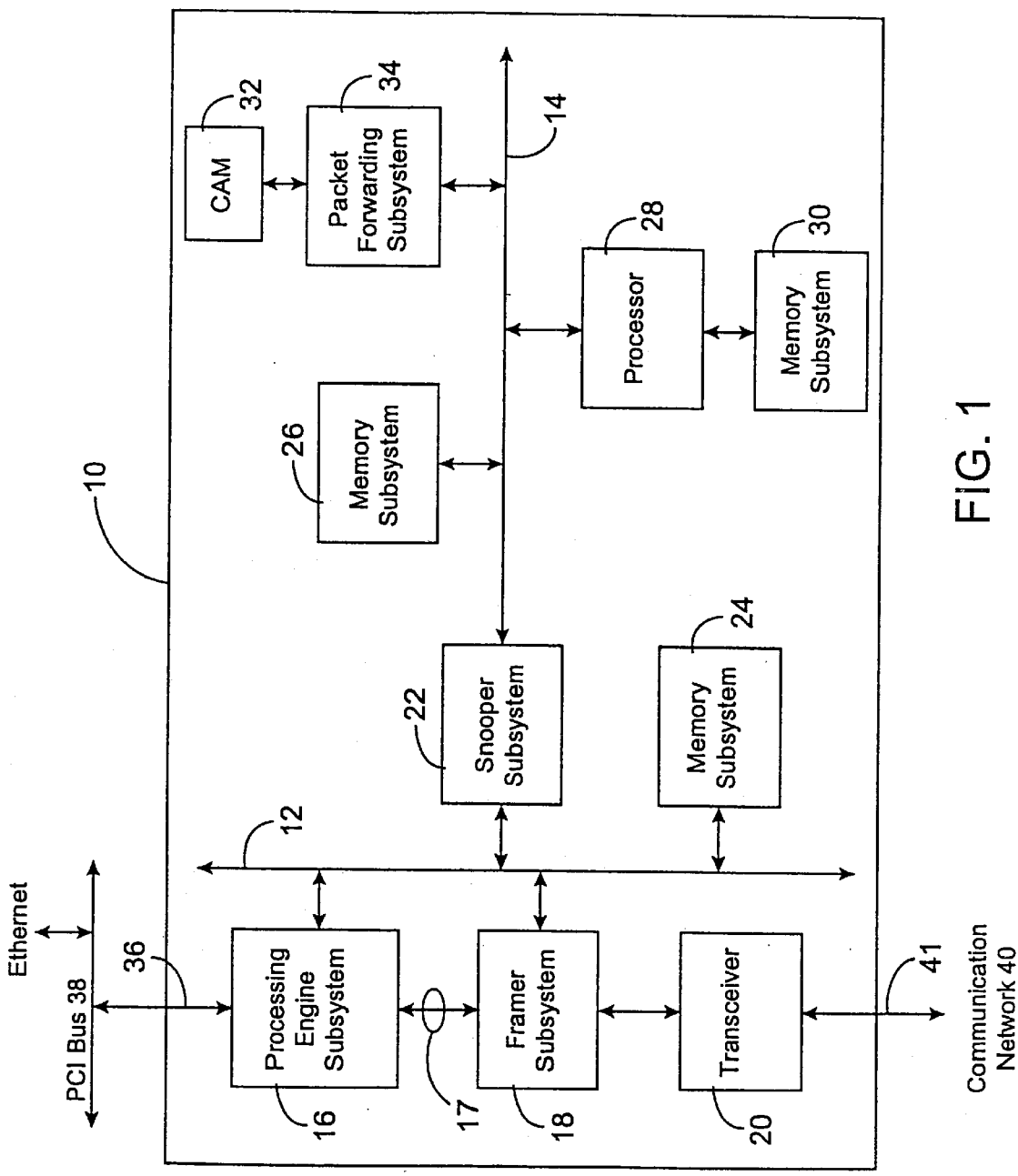
FIG. 1 depicts a simplified block diagram of a network processor according to an embodiment of the present invention.

FIG. 1 depicts a simplified block diagram of a network processor (NP) 10 according to an embodiment of the present invention. In the embodiment depicted in FIG. 1, network processor 10 is coupled with the Ethernet/Token Ring network via a PCI bus 38 and coupled with communication network 40 via communication link 41. In one embodiment network processor 10 includes a number of memories and subsystems coupled to a first internal bus 12 and a second internal bus 14. The subsystems coupled with first internal bus 12 may include a processing engine subsystem 16, a framer subsystem 18, a transceiver 20, a snooper subsystem 22, and memory subsystem 24. Subsystems coupled with second internal bus 14 may include a processor 28 along with its associated memory subsystem 30, a second memory subsystem 26, and a packet forwarding subsystem 34 coupled to a content addressable memory (CAM) 32. Internal buses 12 and 14 provide a mechanism allowing the various subsystems of network processor 10 to communicate with one another as intended.

Memory subsystems 24, 26, and 30 may include a number of memories including random access memories (RAMs) such as synchronous dynamic random access memory (SDRAM) and synchronous static random access memory (SSRAM). Memory subsystem 30 may also include flash memories for storing software images. Memory subsystems 24 and 26 provide storage facilities for software modules and other data constructs used by the present invention and those needed by network processor 10 to perform its functions. In one embodiment, memory subsystem 24 provides storage for data packets received by NP 10 from communication network 40 and from the Ethernet/Token Ring network.

Processing engine subsystem 16 provides processing services for a broad range of high speed network traffic types, including frames, cells, and packets at high data rates, for example, 622 Mbps full duplex. Processing engine subsystem 16 provides an industry standard PCI (e.g. 64 bit) and memory (e.g. 64-bit) interface. In one embodiment, processing engine subsystem 16 also provides an industry standard UTOPIA interface 17 for direct coupling with a broad range of Layer 1 physical interfaces. Processing engine subsystem 16 integrates Layer 2 functions and provides extensive hardware assist for processor 28 or packet forwarding subsystem 34 or Layer 3 functions for a variety of high speed network protocols.

Integrated functionality includes providing ATM interfaces for a packet switching core, providing packet interfaces for an ATM switching core, providing LEC functionality, providing multi-protocol over ATM client (MPC) functionality, memory management, system-level buffering, providing a flexible traffic scheduler, ATM Segmentation and Re-assembly (ATM SAR) functionality, Multi-Protocol Over ATM (MPOA) support, LANE support, tagging, multi-protocol label switch (MPLS) functionality, and raw packet format processing assist, hardware encapsulation and direct memory access (DMA) control. Processing engine subsystem 16 supports a broad range of applications executing on various access platforms, multi-protocol routers, internet protocol (IP), ATM and workgroup switches, and Gigabit Ethernet platforms. Processing engine subsystem 16 uses hardware-based state machines to obtain enhanced operation speed. There is no local processor within processing engine subsystem 16 in the path of any cell or packet transaction to slow down the operation of the system.

Figure 2:
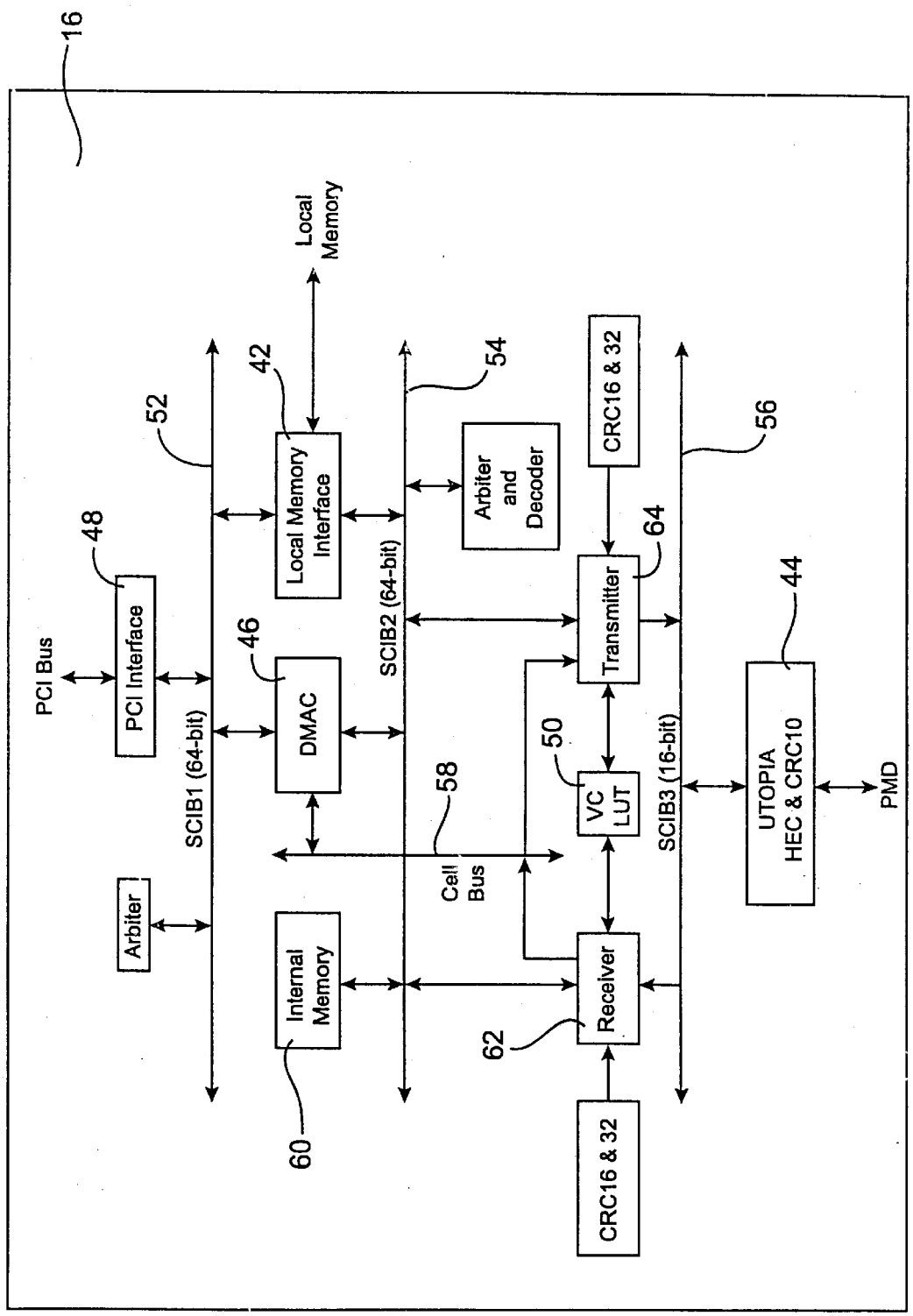
FIG. 2 depicts a simplified block diagram of the general architecture of a processing engine subsystem according to an embodiment of the present invention.

FIG. 2 depicts a simplified block diagram of the general architecture of processing engine subsystem 16 according to an embodiment of the present invention. Processing engine 16 includes a local memory interface block 42, UTOPIA interface 44, Direct Memory Access Controller (DMAC) 46, PCI interface 48, VC caching and look-up table 50, first internal bus 52, second internal bus 54, third internal bus 56, and cell bus 58. Processing engine subsystem 16 also includes an internal memory 60 and a receiver module 62 and a transmitter module 64 for processing incoming and outgoing data transmissions, respectively, over a communications interface, such as UTOPIA interface 44. Local memory interface block 42 provides a connection to a local (off-chip) system memory, such as memory subsystem 24 which may include SDRAM, SSRAM or any combination thereof DMAC 46 provides a high speed transfer mechanism for transferring data between external memories (PCI), internal memory 60 and the local memory. Internal memory 60 is used in one embodiment to store VC descriptors on-chip for fast access of VC descriptors. Additionally, in one embodiment, internal memory 60 stores allowed cell rate (ACR) and minimum cell rate (MCR) bitmaps to provide enhanced ABR traffic scheduling capabilities. Internal memory 60 may also have bitmaps to provide sophisticated receive buffer management.

PCI interface 48 provides a connection to external intelligence, such as a host computer system, and external packet memories. PCI interface 48 includes input and output buffers and performs write transactions in both directions. The inbound write may result when a memory external to NP 10 is read, while the outbound write may occur when NP 10 writes to external memory.

First and second internal buses 52 and 54 in one embodiment are non-multiplexed 32 bit address and 64 bit data buses. Depending on the desired line rate, PCI interface 48 may be configured to run at frequencies up to 33 MHz over a 32 bit PCI bus, or at frequencies up to 66 MHz over a 64 bit PCI bus. For example, to achieve a 622 Mbps line rate, a 64 bit interface is used with frequencies up to 66 MHz. UTOPIA interface 44 supports connections to a broad range of layer 1 physical interfaces, including, for example, OC-1, OC-3, OC-12, OC-48, OC-192 and DS-3 interfaces and the like. To support a 622 Mbps line rate, the UTOPIA data bus is 16 bits, whereas for a 155 Mbps line rate the UTOPIA bus is 8 bits. Third internal data bus 56 is an 8 or 16 bit UTOPIA compatible interface. Cell bus 58 is a 64 bit data path and is used to transfer cells or frames between internal cell/frame buffers of receiver block 62 and transmitter block 64 and the PCI memory space or local memory space through DMAC 46. Cell bus 58 allows several transactions to occur in parallel. For example, data payload transfers and descriptor data movement may occur simultaneously. Additionally, for a 622 Mbps line rate, cell bus 58 is capable of off-loading up to 160 MBps of bandwidth from local memory.

VC caching and look-up table 50 is used to translate the descriptor pointer address for a virtual channel (VC) that has been registered in processing engine subsystem's internal cache. In one embodiment, for each VC descriptor registered in the internal memory, there is an associated entry in VC LUT 50. The caching scheme significantly increases throughput and reduces the bandwidth needed in the local memory to fetch, update and process VC descriptors. In preferred embodiment, all components of processing engine subsystem 16 reside on a single chip (e.g., a single silicon chip), however in alternate embodiments, the components may be spread across many chips such that processing engine subsystem 16 is implemented using several chips.

The data processing capabilities of processing engine subsystem 16 can be generally classified into four areas: receive data (from the UTOPIA port), transmit data (to the UTOPIA port), DMA data transfer (between the PCI bus and the local bus), and UTOPIA loop back (from the UTOPIA port back to the UTOPIA port). Processing engine subsystem 16 transparently transfers packets from the PCI bus to the local bus and vice versa via direct memory access (DMA). Additionally, processing engine subsystem 16 transfers the received UTOPIA data back to the transmit UTOPIA port on a per VC basis.

Incoming data or data received from the UTOPIA port to either the local bus or the PCI bus is checked for the proper AAL or OAM protocol, and optionally policed for traffic shape conformance. For AAL5, the processing includes length and CRC-32 verification. For OAM cells, the CRC-10 is checked. Additionally, processing engine subsystem 16 has the ability to add, on a per VC basis a 4, 8, 12 or 16-byte tag to the front of each packet as will be discussed in more detail below.

Processing engine subsystem 16 performs three major operations on the outgoing data (from the PCI or the local bus to the UTOPIA port) according to a preferred embodiment of the present invention. First, engine 16 provides an offset which allows packet transmission to begin from any one of the first 63 bytes of the packet buffer on a per-packet basis. This offset option combined with a packet source's ability to place a packet anywhere within the first 63 bytes of the buffer implements a generic header capability. In preferred aspects, up to 63 bytes are added or removed from the front of the packet on a per-packet basis. Second, engine 16 optionally adds one of several predefined packet headers on a per-packet basis. Third, engine 16 adds the AAL and/or OAM overhead to the packet. According to one embodiment, engine 16 supports a wide range of packet encapsulations such as Raw ATM, AAL5 with LLC/SNAP, LANE (v1 and v2), MPOA, and MPOA without Tag.

Referring to the NP 10 architecture shown in FIG. 1, transceiver 20 receives and transmits traffic to communication network 40, such as an ATM network, via communication link 41. In one embodiment, transceiver 20 is a fiber-optic transceiver. In one embodiment, framer subsystem 18 creates cells from data stream received via ATM SONET via transceiver 20. Alternatively, framer subsystem 18 converts cells to data bit streams to be transported. Memory subsystem 24 provides memory resources for processing performed by processing engine subsystem 16. The ATM or Ethernet packets received by network processor 10 are usually written to memory subsystem 24.

Snooper subsystem 22 is coupled both to first internal bus 12 and second internal bus 14, and provides a bridge between the two internal buses. In one embodiment, snooper subsystem 22 "snoops" or extracts the headers of packets written to memory subsystem 24 and makes them accessible to packet forwarding subsystem 34 and processor 28 by writing them to memory subsystem 26. The snooped headers can then be accessed by processor 28 or by packet forwarding subsystem 34 for further processing.

Packet forwarding subsystem 34 provides the hardware assist for processing of data frames and packets in order to achieve broadband data path speed. In one embodiment, packet forwarding subsystem 34 is a re-programmable hardware device which may be configured to process Ethernet, voice, carrier access, LANE, or customer specific traffic types. According to an embodiment of the present invention, packet forwarding subsystem 34 also provides LAN emulation (LANE) and Layer 3 virtual LAN (VLAN) functionality.

CAM 32 facilitates processing performed by packet forwarding subsystem 34. In one embodiment CAM 32 stores LAN emulation client (LEC) up-link information which provides mapping of media access control (MAC) destination addresses to virtual channel connections (VCCs) and vice versa. The LEC up-link information is usually set up and maintained by processor 28. In one embodiment, CAM 32 is a hardware lookup table.

Processor 28 executes the system and application level functions/modules which provide the functionality of the present invention, including protocol stack assisted routing modules, for network processor 10. This includes applications for controlling the functionality of network processor 10. The software modules corresponding to the applications are generally stored in memory subsystem 30. In alternate embodiments, the software modules may be stored in any other memory accessible to processor 28 such as memory subsystem 26. Memory subsystem 26 provides memory resources for processing performed by processor 28 and packet forwarding subsystem 34. In one embodiment, memory subsystem 26 stores a LEC information table which is maintained and updated by processor 28 and is used by packet forwarding subsystem 34 and processor 28 for providing routing functionality. As new LECs are added or deleted from emulated LAN, processor 28 updates the LEC information table to reflect the current state of the emulated LAN.

FIGS. 3A through 3D depict examples of ways in which a host system may interface with network processor 10. In the embodiment depicted in FIG. 3A, network processor (NP) 10 is coupled with a host system 70 via a Peripheral Component Interconnect (PCI) bus 38 and also coupled with communication network 40. PCI bus 38 is merely an example of a mechanism by which NP 10 and host 70 communicate with each other. It should be apparent to one of ordinary skill in the art that other communication techniques may also be used and are within the scope of the present invention. NP 10 may be used for a variety of applications including implementation in multi-protocol network interface cards (NICs), server NICs, workgroup, IP and ATM switches, multi-protocol and IP routers ATM backbone switch applications, multi-protocol/ATM adapters and the like.

According to the present invention, device control module (DCM) 74 is responsible for controlling the functioning of NP 10. In one embodiment, DCM 74 provides a set of application programming interfaces (APIs) 76 which may be used by external application entities to issue commands to control the functionality of NP 10. APIs 76 allow applications such as host application 72 to issue commands to NP 10 and to receive messages/responses from NP 10. DCM 74 provides APIs for a plurality of functions performed by NP 10 and allows host application to exercise fine-grained device level control of NP 10. Examples of these functions include but are not limited to diagnostic functions, configuration functions, initialization functions, statistics gathering functions, interrupt handling, status and error monitoring functions, functions for managing physical layer hardware devices connected to NP 10 such as single OC 12, dual OC3, or quad OC3 devices, and several other functions supported by NP 10. In the embodiment depicted in FIG. 3A, DCM 74 executes on host system 70. However, in alternate embodiments of the present invention, DCM 74 may execute on processor 28 of NP 10 or may execute on both host system 70 and NP 10.

As stated above, external applications such as host application 72 interface with NP 10 using APIs 76 provided by DCM 74. DCM 74 processes the commands issued by host application, and forwards them to subsystems and components of NP 10 for execution. DCM 74 may also receive responses to the commands which are then forwarded by DCM 74 to the external entities which issued the command. Responses may be provided in a synchronous or asynchronous manner. In alternate embodiments, DCM 74 may generate events/triggers to notify host application 72. As previously stated, host application 72 executing on host system 70 is an example of an external entity which issues commands to and receives responses from DCM 74.

According to an embodiment of the present invention, DCM 74 is host operation system independent and provides APIs which are also operation system independent. Accordingly, DCM 74 is portable to various network operating systems (NOSs). Consequently, DCM 74 along with its APIs 76 simplifies the integration of NP 10 with host system 70.

Figure 3A:
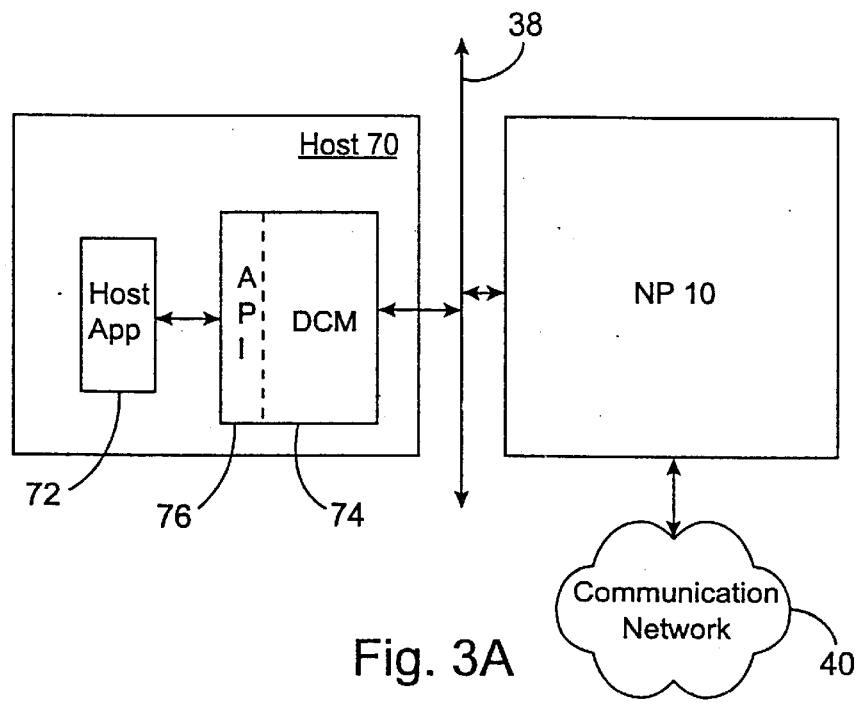
FIG. 3A is a schematic diagram illustrating one embodiment of an interface between a host system and the network processor of FIG. 1.
Figure 3B:
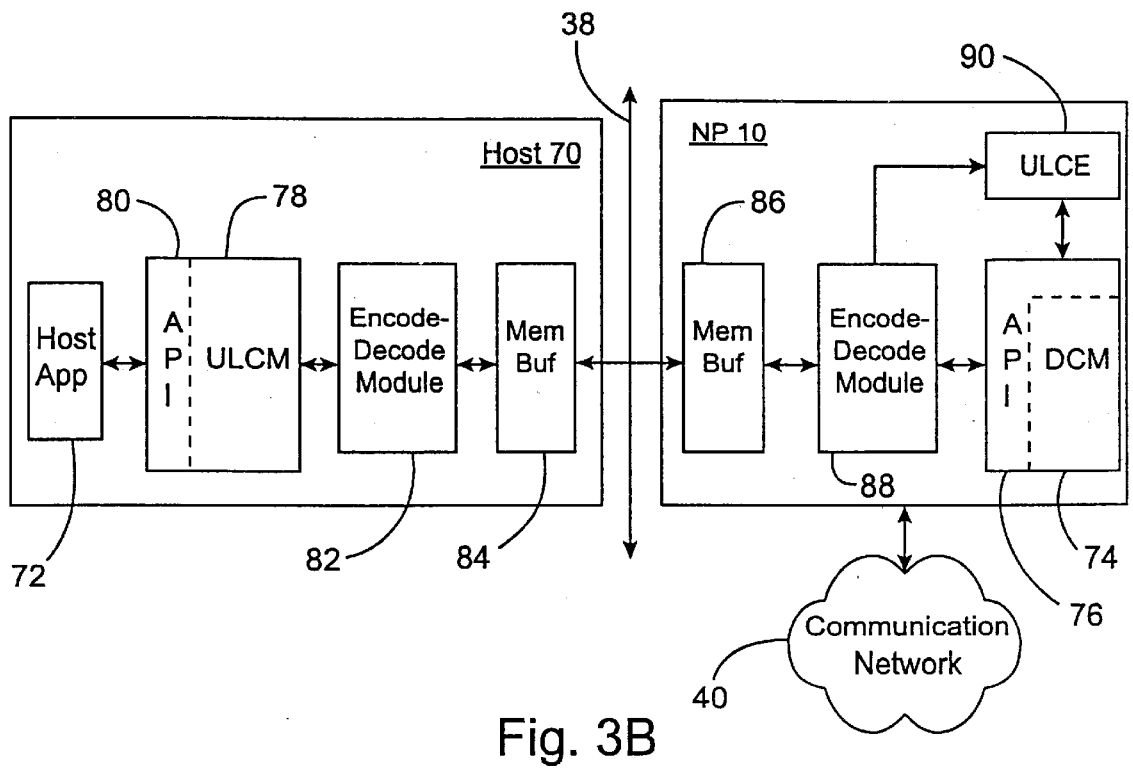
FIG. 3B is a schematic diagram illustrating another embodiment of an interface between a host system and the network processor of FIG. 1.

FIG. 3B depicts an alternative embodiment for interfacing host system 70 with NP 10. The configuration depicted in FIG. 3B is generally useful for integrating NP with PCI based hosts. In this embodiment, DCM 74 executes on NP 10. Host application 72 issues commands to NP 10 using APIs 80 provided by an upper-level command module (ULCM) 78. ULCM APIs 80 provide a set of well defined programming interfaces that allow a host application to configure and monitor NP 10 in the control plane, and to send and receive LAN traffic in the data plane.

ULCM APIs 80 are intended to encapsulate as much as possible the underlying messaging between host system 70 and NP 10, and further to encapsulate the details associated with APIs provided by DCM 74. Accordingly, unlike DCM 74 which provides APIs for fine-grained control of NP 10, APIs 80 provided by ULCM 78 enable higher level control of NP 10. In one embodiment of the present invention, ULCM APIs 80 can be mapped to one or more DCM APIs 76. ULCM APIs 80 can accordingly be modified to customize the functionality of NP 10 without making changes to the lower level APIs 76 provided by DCM 74 in different host environments. This increases the compatibility of the present invention across different networking host environments and network operating systems. In one embodiment, ULCM 78 provides high level software for performing various functions such as LAN emulation over ATM, classical IP over ATM, MPOA, and MPLS. For example, if host 70 needs to provide an ATM up-link for a gigabit router, ULCM 78 provides LAN emulation APIs to provide the functionality.

In one embodiment of the present invention, commands issued by host application 72 by using ULCM APIs 80 are processed by ULCM 78 and then forwarded to encode-decode module 82. Encode-decode module 82 encapsulates the commands into memory structures or messages and writes the memory structures to memory buffers 84 or 86. Memory buffers 84 and 86 facilitate exchange of information between host system 70 and NP 10 across a PCI bus 38 interface. In one embodiment the message buffers enable asynchronous communication between host 70 and NP 10. The memory structures may be written to memory buffer 86 by host 70, or alternatively, the memory structures may be written to memory buffer 84 and then forwarded to memory buffer 86.

Encode-decode module 88 in NP 10 then reads the memory structures corresponding to the commands either from memory buffers 84 or 86. Encode-decode module 88 may then decode the memory structures and make calls to appropriate DCM APIs 76. DCM 74 then processes the commands and forwards the commands to subsystems of NP 10 for execution. Alternatively, encode-decode module 88 may decode the memory structures and make calls to upper level control engine (ULCE) 90. ULCE 90 performs processing for functions of upper protocol layers. ULCE 90 may perform processing by calling one or more APIs 76 of DCM 74.

Responses to the commands, if any, received by DCM 74 may be forwarded to encode-decode module 88 which encapsulates the responses into memory structures or messages and writes the memory structures to the memory buffers 84 or 86. These encapsulated responses may then be read by encode-decode module 82 on host 70 and then forwarded to host application 72 via ULCM 78.

The memory buffers illustrate an exemplary mechanism for communicating information between host system 70 and NP 10. It should be apparent to one of ordinary skill in the art that alternate mechanisms for exchanging information between host system 70 and NP 10 are also within the scope of the present invention.

Figure 3C:
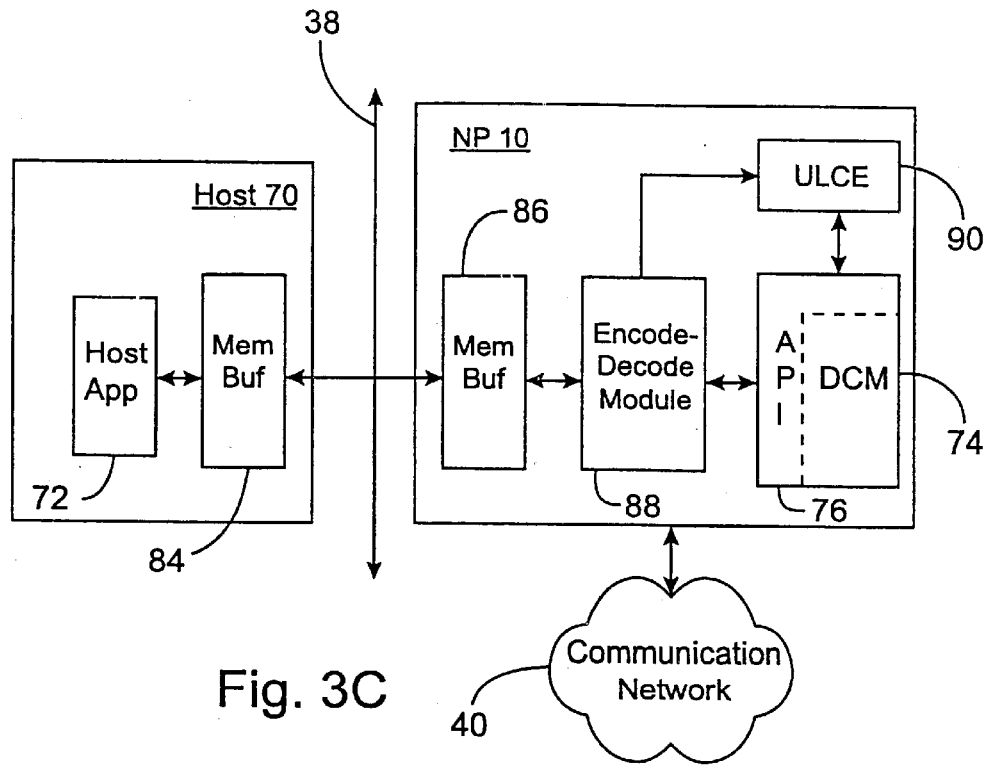
FIG. 3C is a schematic diagram illustrating a further embodiment of an interface between a host system and the network processor of FIG. 1.

The embodiment depicted in FIG. 3C is similar to the embodiment shown in FIG. 3B except that host application 72 writes the memory structures encapsulating the commands directly into memory buffer 84 or 86. This embodiment allows host applications to exercise very fine-grained control over NP 10. In this embodiment, the function of encoding and decoding the command/response memory structures is performed by host application 72. This kind of configuration is generally useful for integrating NP 10 with proprietary switches.

Figure 3D:
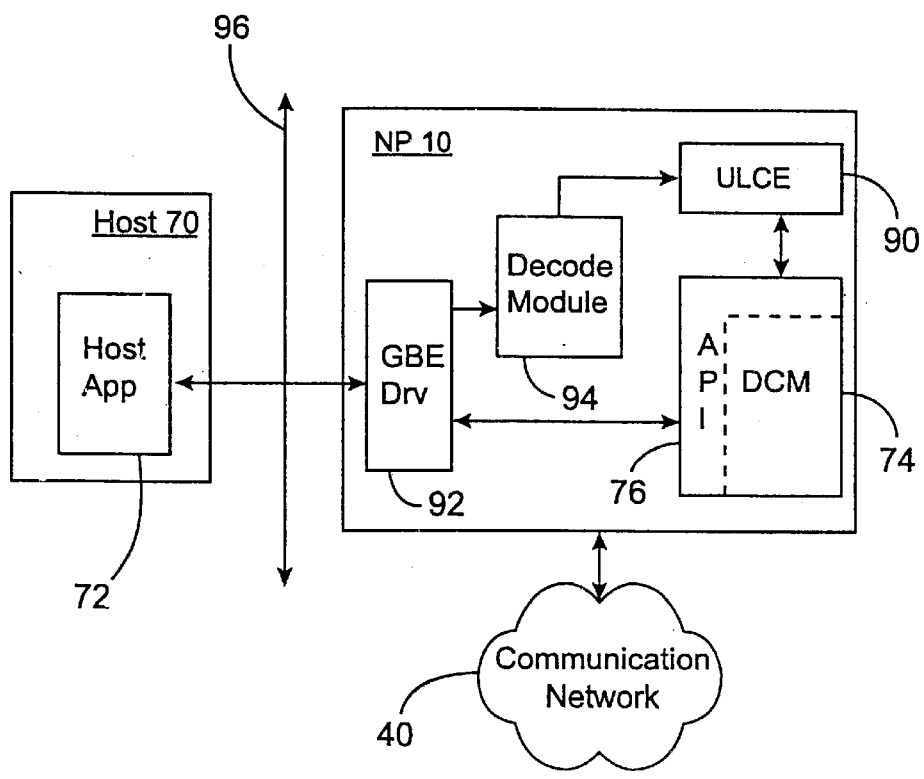
FIG. 3D is a schematic diagram illustrating yet another embodiment of an interface between a host system and the network processor of FIG. 1.

In the embodiment depicted in FIG. 3D, host system 70 is coupled with NP 10 via a Gigabit Ethernet Interface (GBE) 96. This type of configuration is generally useful for integrating NP 10 with GBE switches. In this embodiment, host application 72 and NP 10 communicate with each other via the GBE interface using in-band messaging. In this embodiment, a GBE device driver 92 generally executes on NP 10 and receives commands issued by host application 72. GBE device driver 92 may then call the appropriate APIs provided by DCM 74 or alternatively may forward the command to decode module 94. Decode module 94 may decode the commands and make calls to upper level control engine (ULCE) 90. ULCE 90 may perform processing by calling one or more APIs 76 of DCM 74.

Figure 4A:
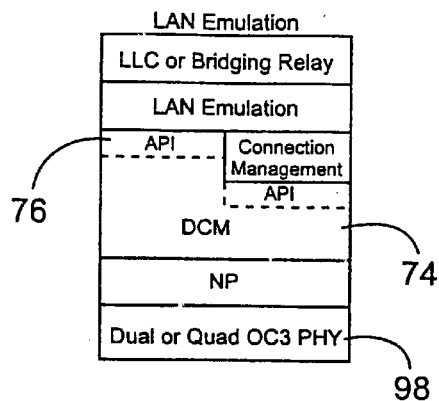
FIG. 4A is a schematic diagram illustrating one embodiment of an upper layer software protocol stack that may utilize one or more APIs.
Figure 4B:
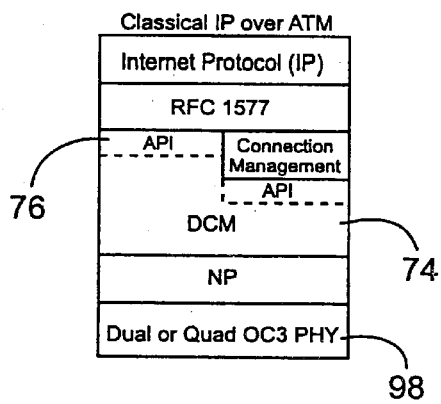
FIG. 4B is a schematic diagram illustrating another embodiment of an upper layer software protocol stack that may utilize one or more APIs.
Figure 4C:
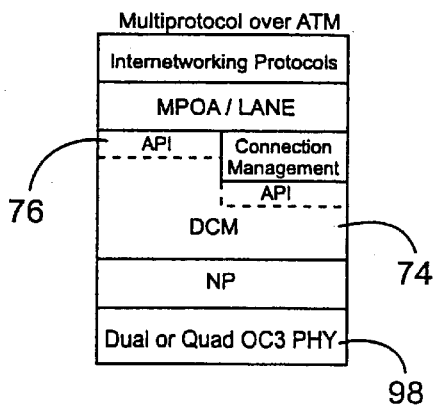
FIG. 4C is a schematic diagram illustrating a further embodiment of an upper layer software protocol stack that may utilize one or more APIS.

FIGS. 4A through 4C depict the various upper layer software protocol stacks that may utilize APIs 76 provided by DCM 74. FIG. 4A depicts a LAN Emulation (LANE) stack comprising an LLC or Bridging Relay layer, a LAN emulation layer, and connection management layer. FIG. 4B depicts a classical internet protocol (IP) over ATM protocol stack comprising an IP layer, a RFC 1577 layer, and a connection management layer. FIG. 4C depicts a multi-protocol over ATM (MPOA) protocol stack comprising an internetworking protocol layer, a MPOA/LANE layer, and a connection management layer. As shown in FIGS. 4A–4C, NP 10 may be coupled with a dual or quad OC3 physical device 98.

In one embodiment of the present invention APIs 80 provided by ULCM 78 allow a host application to perform functions corresponding to the upper layer software protocol stacks as depicted in FIGS. 4A–4C. In this embodiment, the functions corresponding to the upper layer protocol stack functions are accomplished by ULCE 90 using the APIs 76 provided by DCM 74, as shown in FIGS. 3B, 3C, and 3D.

As previously stated, according to embodiments of the present invention, communication of commands and responses between host system 70 and NP 10 is facilitated by message buffers provided by host 70 and NP 10. The commands and responses are encapsulated into memory structures or messages which are written to and read from the memory buffers. Memory structures encapsulating the commands are usually written to the memory buffers by host application 72 and read from the memory buffers by DCM 74. In alternate embodiments, command memory structures may also be written by DCM 74 and read by host application 72. Response messages are generally written by DCM 74 and read by host application 72.

Figure 5:
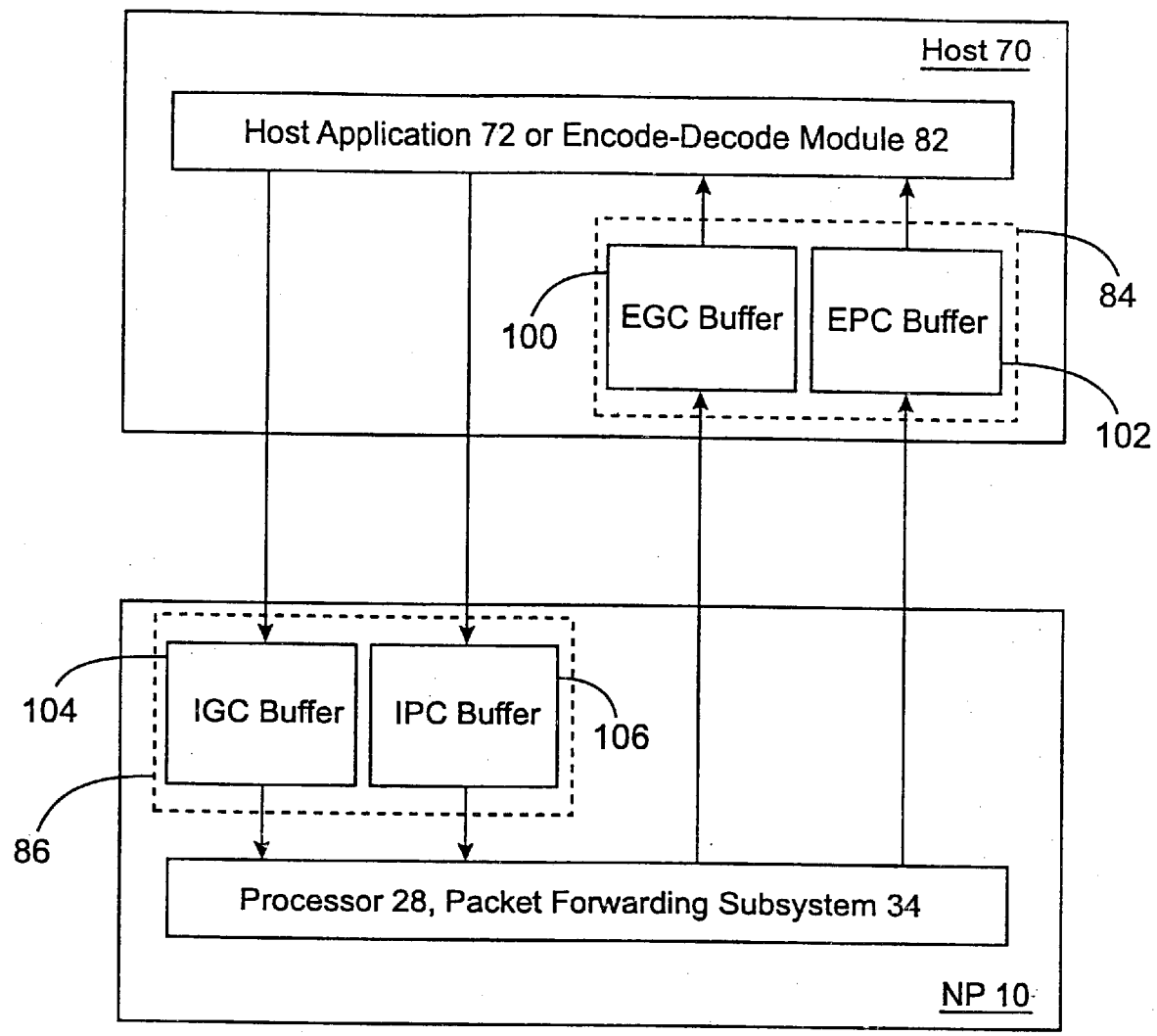
FIG. 5 depicts a simplified block diagram of memory buffers provided by a host system and a network processor for exchanging information according to an embodiment of the present invention.

FIG. 5 depicts a simplified block diagram of memory buffers 84 and 86 according to an embodiment of the present invention. As shown, memory buffers 84 and 86 may include four memory buffers 100, 102, 104, and 106 which are used for communicating messages between host 70 and NP 10. Memory buffer 86 may include two ingress buffers 104 and 106, while memory buffer 84 may include two egress buffers 100 and 102. In order to achieve a high packet throughput and device performance, ingress buffers 104 and 106 reside within the memory (typically SSRAM) address space of NP 10, while egress buffers 100 and 102 reside in the PCI address space on host 70. In order to achieve peak line rates, separate buffers are used for packet transfer commands and general commands since the packet transfer commands, unlike the general commands, are not processed by processor 28 on NP 10 but are processed by packet forwarding subsystem 34.

As shown in FIG. 5, the four memory buffers include an ingress general command buffer (IGC) 104, an ingress packet command buffer (IPC) 106, an egress general command buffer (EGC) 100, and an egress packet command buffer (EPC) 102. IGC 104 and IPC 106 message buffers are used to convey messages from host processor to NP 10, while EGC 100 and EPC 102 memory buffers are used to convey messages from NP 10 to host 70. As previously stated, memory buffers IPC 106 and IGC 104 are located in the memory space of NP 10, and memory buffers EPC 102 and EGC 100 are located in PCI memory space on host 70. In one embodiment, the four memory buffers are implemented as circular memory rings. Pointers are maintained by host 70 and NP 10 to ensure that no unprocessed memory structure gets overwritten and no unwritten memory structure is processed.

Figure 6:
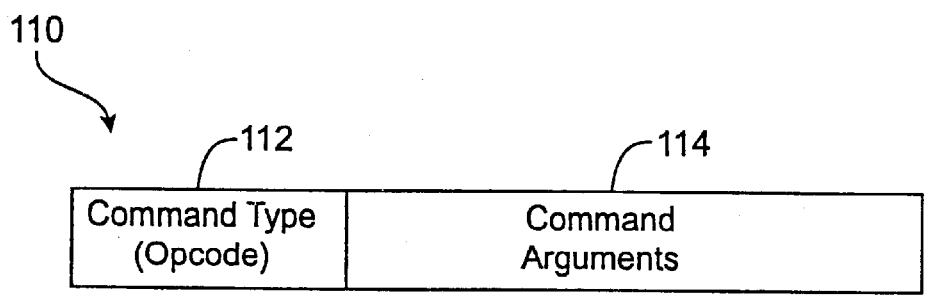
FIG. 6 depicts an exemplary memory structure used for encapsulating a command written to the memory buffers according to an embodiment of the present invention.

FIG. 6 depicts an exemplary memory structure 110 which may be used for encapsulating a command and which is written to the memory buffers. Memory structure 110 includes a first section 112 which stores the command type, and a second section 114 which stores arguments of the corresponding command. In one embodiment, command type section 112 stores the opcode for the command. Command argument section 114 is of variable length depending on the type of command. An argument count indicating the number of arguments for the command in section 112 is typically included in section 114.

According to an embodiment of the present invention, memory structures are written to the IGC buffer 104 for the following commands: (1) reset engine; (2) initialize engine; (3) configure buffer management; (4) open virtual circuit (VC); (5) close VC; (6) get statistics; (7) update EGC read pointer; and (8) update EPC read pointer.

According to an embodiment of the present invention, memory structures are written to the EGC buffer 100 for the following commands: (1) EGC nop; (2) reset complete; (3) initialize complete; (4) configure buffer response; (5) open VC confirm; (6) close VC confirm; (7) VC statistic results; (8) update IGC read pointer; and (9) update IPC read pointer.

According to an embodiment of the present invention, memory structures are written to the IPC buffer 106 for the following commands: (1) add packet; (2) add buffer; and (3) receive (Rx) buffer return.

According to an embodiment of the present invention, memory structures are written to the EPC buffer 102 for the following commands: (1) EPC nop; (2) Rx packet indication; and (3) transmit (Tx) buffer return. For further details on the functionality of memory buffers and for descriptions of the memory structure formats for the various commands listed above, please refer to Appendix A which has been attached to this application.

As described above, the present invention provides two sets of APIs 76 and 80 for controlling the functionality of NP 10. APIs 76 provided by DCM 74 allow a host application to exercise fine-grained device level control of NP 10. Examples of these functions include but are not limited to diagnostic functions, configuration functions, initialization functions, statistics gathering functions, interrupt handling, status and error monitoring functions, functions for managing physical layer hardware devices connected to NP 10 such as single OC12, dual OC3, or quad OC3 devices, and several other functions supported by NP 10. The DCM APIs 76 are described in patent application Ser. No. 09/344,640, entitled "METHOD AND APPARATUS FOR CONTROLLING A NETWORK PROCESSOR," filed concurrently with the present application and assigned to a common assignee, the entire disclosure of which is herein incorporated by reference for all purposes.

According to an embodiment of the present invention, ULCM 78 provides a set of application programming interfaces (APIs) 80 that allow a PCI host system to control the functioning of NP 10 and also perform various network data manipulation functions. Accordingly, the APIs allow PCI host 70 to configure and monitor NP 10 in the control plane, and to send and receive network data in the data plane. By providing user friendly APIs 80, ULCM 78 encapsulates as much as possible the underlying messaging between host 70 and NP 10 involving the memory buffers and further encapsulates details associated with DCM APIs 76. APIs 80 provided by ULCM 78 are general enough to be mapped into APIs 76 provided by DCM 74. This allows the underlying DCM 74 to remain unchanged in different host environments. This increases the compatibility of the present invention across different networking host environments and network operating systems. ULCM 78 also provides APIs for performing functions corresponding to the upper layer software protocol stacks, such as the MPOA protocol stack, LANE protocol stack, and IP over ATM protocol stack. Further details on the ULCM APIs 80 are given below As previously explained, according to an embodiment of the present invention, messaging between PCI host 70 and NP 10 is asynchronous in nature. NP 10 receives commands from host 70 and the responses to the received commands are implemented as asynchronous callback functions from NP 10 to host system 70. Messages or commands may also be asynchronously generated by NP 10. The messaging may either be polled or interrupt based. In both the polling system and the interrupt based system, the parsing of incoming messages and the dispatching of the callback functions are dependent on the execution of modules by processor 28 of NP 10.

According to an embodiment of the present invention, the various APIs 80 provided by ULCM 78 can be grouped into categories containing APIs related to: (1) system initialization and configuration commands and responses; (2) SONET layer related commands and responses; (3) ATM signaling commands and responses; (4) ILMI commands and responses; (5) LANE related commands and responses; (6) Layer 2 bridging commands and responses; (7) system facilities commands and responses; (8) system diagnostics commands and responses; and (9) network management commands and responses. The APIs for each of these categories are explained below in further detail.

In order to clearly differentiate between commands issued via APIs from host 70 to NP 10 and responses to the commands via asynchronous callbacks from NP 10 to host 70, APIs related to the commands will be labeled "<APIfunction_name>_Req" while callback APIs related to the responses will be labeled "<APIfunction_name>_Rsp." For example, an API for issuing a command to reset NP 10 will be labeled "ResetNP_Req." The API response callback to the reset command from NP 10 to host 70 will be labeled "ResetNP_Rsp." Asynchronous messages generated by NP 10 but which are not in response to a command will be labeled "<APIfunction_name>_Ind." The API function names are not meant to in any manner limit the scope of the present invention. It should be apparent to one of ordinary skill in the art that the API function names are used merely to facilitate explanation of the various APIs provided by the present invention.

(1) System Initialization and Configuration Commands and Responses

According to an embodiment of the present invention, various APIs are provided for initializing and configuring NP 10. These APIs include:

(a) Reset_Req( )

According to an embodiment of the present invention, an API is provided allowing host 70 to issue a command to reset NP 10 or subsystems thereof. The API allows host 70 to request either a "hard" reset, which causes a hardware reset of NP 10, for example a power up, or a "soft" reset whereby either the receiver subsystem 62 within processing engine subsystem 16 or the transmitter subsystem 64 within processing engine subsystem 16, or both may be reset. An implied Reset_Req( ) is executed after system power-up of NP 10.

In one embodiment, the API may be implemented as a function such as:

status Reset_Req(ResetType)

"ResetType" parameter indicates the reset type. For example, in one embodiment, a 0x00 value may indicate that all resets should be cleared, a 0x01 value may indicate that receiver module 62 in processing engine subsystem 16 should be cleared, a 0x02 value may indicate that transmitter module 64 in processing engine subsystem 16 should be cleared, a 0x03 value may indicate that both the receiver 62 and transmitter 64 modules should be cleared, and a 0x04 value may indicate a reset command for all the subsystems in NP 10. Generally all registers are reset, except the PCI configuration registers. After a hard rest or a power cycle, both the receiver 62 and transmitter 64 modules will be reset and need to be cleared before any data traffic can be received or transmitted.

The "status" field indicates an error if an invalid reset type is used, or okay otherwise.

(b) Reset_Rsp( )

Reset_Rsp( ) is a callback routine which indicates that NP 10 has successfully completed the reset corresponding to a Reset_Req( ) API command issued by a host application.

In one embodiment, the API may be implemented as a function such as:

void Reset_Rsp(ResetType, BankIndex, MajorVersion, MinorVersion, BuildNumber, VersionString)

The "ResetType" parameter is the same as the "ResetType" parameter described in Reset_Req( ). Accordingly, in one embodiment, a "ResetType" value of 0x00 indicates that all reset have been cleared, a values of 0x01 indicates that the receive module has been reset, a 0x02 value indicates that the transmit module has been reset, a 0x03 value indicates that both receive and transmit modules have been reset, a 0x04 value indicates that a hard reset has been completed, for example after a power cycle of NP 10, and a 0xFF value indicates the failure of system diagnostics. After system power-up of NP 10, an implied Reset_Req( ) is executed and this callback is called with a "ResetType" value of 0x04 indicating that NP diagnostics have failed as a result of a hard reset or power cycle. A Boot_Req( ) API is then generally invoked to start the boot sequence.

The "BankIndex" parameter indicates the index of the flash bank that NP 10 booted from. In one embodiment, the flash banks are part of the memory subsystems on NP 10. Other optional parameters such as "MajorVersion" which indicates the major version number of the firmware on NP 10, "MinorVersion" which indicates the minor version number of the firmware on NP 10, "BuildNumber" which indicates the build number of the firmware on NP 10, and "VersionString" which is an ASCII string representation of the firmware version of NP 10, may also be included in the parameter list.

(c) Bind_Req( )

According to an embodiment of the present invention an API is provided allowing host 70 to issue a command to perform the requires initialization to establish messaging communication between host 70 and NP 10. This API is typically invoked after the Reset_Rsp( ) callback has been called. The Bind_Rsp( ) callback is invoked after the Bind_Req( ) function has completed its processing. Additional APIs may then be invoked to further configure NP 10. In order to cause NP 10 to start providing service, host 70 then calls API function Initialize_Req( ).

In one embodiment, the API may be implemented as a function such as:

status Bind_Req( )

The "status" field indicates an error if an invalid parameter is used, okay otherwise.

(d) Bind_Rsp( )

Bind_Rsp( ) is a callback routine which indicates that NP 10 has completed the binding process and is ready to be initialized. This callback is invoked asynchronously in response to the Boot_Req( ) command and indicates that NP 10 is ready to be initialized via a call to API Initialize_Req ( ). No other ULCM APIs may be invoked by host 70 prior to receiving this asynchronous callback.

(e) Load_Req( )

According to an embodiment of the present invention, an API is provided allowing host 70 to issue a command to download software to NP 10. This command API downloads a new software image to NP 10. In order to download an entire image, Load_Req( ) needs to be called sequentially with parameters specifying sequential and contiguous blocks of the image. The flash on-board NP 10 may be programmed when the final block is received. The API is preferably called after a Boot_Rsp( ) callback.

In one embodiment, NP's flash memory is divided into two blocks, each capable of holding a complete software image. NP 10 boots using the image in the bank that has been specified by the last successful call to API FlashBank_Req ( ). This allows a new software image to be downloaded and tested. Reversion to the previous software will occur on hard reset unless FlashBank_Req( ) has been called with the non-volatile parameter set.

In one embodiment, the API may be implemented as a function such as:

status Load_Req(BankIndex, Offset, BlockSize, BytesRemaining, Block)

Parameter "BankIndex" indicates the number of the flash bank to be used for programming. If the flash bank number is greater than the available number of flash memories, the download is aborted. The "Offset" parameter indicates the offset in bytes from the start of the image to the start of the current block. The "Size" parameter indicates the size of the current block. The "BytesRemaining" parameter indicates the bytes remaining in the image after the current block. This parameter should typically be zero for the final block. The "Block" parameter indicates the current block address.

In one embodiment, the "status" field indicates an error if non-sequential block are specified, okay otherwise.

(f) Load_Rsp( )

This callback is invoked asynchronously in response to a Load_Req( ) and indicates whether the software image block was received successfully. For the final image block, the callback indicates if the flash bank was successfully programmed.

In one embodiment, the callback routine may be implemented as:

void Load_Rsp(BankIndex, Offset, BlockSize, BytesRemaining, Status)

The "BankIndex," "Offset," "BlockSize," and "BytesRemaining" parameters have been described in section 1(e). The "Status" parameter indicates the status of the load operation. In one embodiment, a first status value may indicate that the operation was successfully completed, a second status value may indicate that an error occurred during flash memory programming sequence, a third status value may indicate that the image downloaded was not a valid NP 10 firmware image, and a fourth status value may indicate that the block specified was non-sequential.

(g) FlashBank_Req( )

According to an embodiment of the present invention, an API is provided allowing host 70 to issue a command to configure the flash memory bank to be used during the next NP 10 boot. This API may also be used to query the software versions contained in the banks.

In one embodiment, the API may be implemented as a function such as:

status FlashBank_Req(BankIndex, Boolean NonVolatile)

The "BankIndex" parameter indicates the index of the flash bank. The "NonVolatile" parameter is of a Boolean type and is either TRUE or FALSE. The "status" field returns an error if an invalid parameter has been supplied, or okay otherwise.

If "BankIndex" is a valid positive number and the "NonVolatile" parameter is not set, then the specified bank is only attempted for the next boot. If the "NonVolatile" parameter is set, the specified bank becomes the default, and all subsequent boots will be attempted from it. At boot time, the bank specified by the last successful call to FlashBank_Req( ) is used. If this bank does not contain a valid image, then the alternate bank is attempted. If no valid load is found, then NP 10 enters a special mode where if will only respond to Reset_req( ), Bind_Req( ), and Load_req( ). This enables valid software to be downloaded and NP 10 reset. If "BankIndex" is a negative number, then FlashBank_Rsp( ) will report on the contents of the bank indexed by "BankIndex." If "BankIndex" is zero, then FlashBank_Rsp( ) will report on the bank that will be used for the next boot, if "NonVolatile" is not set, and the default boot bank, if "NonVolatile" is set.

(h) FlashBank_Rsp( )

This callback is invoked asynchronously in response to a FlashBank_Req( ) and reports on the contents of the specified flash bank.

In one embodiment, the API may be implemented as a function such as:

void FlashBank_Rsp(BankIndex, flash_status Status, MajorVersion, MinorVersion, BuildNumber, VersionString)

Parameter "BankIndex" indicates the index of the flash bank. Parameter "Status" indicates the status of the bank. In one embodiment, a first "Status" value may indicate that the bank contains valid firmware load, while a second value may indicate that the bank contains invalid firmware load. Other optional parameters such as "MajorVersion" which indicates the number of the firmware if the bank is valid, "MinorVersion" which indicates the number of the firmware if the bank is valid, "BuildNumber" which indicates the build number of the firmware if the bank is valid, and "VersionString" which is an ASCII string representation of the firmware version if the bank is valid, may also be included in the parameter list.

(i) SetMacAddress_Req( )

According to an embodiment of the present invention, an API is provided allowing host 70 to issue a command to configure NP 10 with a medium access control (MAC) address. Each NP 10 is typically factory configured with a globally unique IEEE MAC address that is used as the ESI during the ATM address registration process. Host 70 may override this MAC address by calling the SetMACAddress_Req( ) API. Changing the MAC address will only be reflected in the ATM address of the switch once a new ILMI address registration occurs. To ensure that the configured address is used to form the ATM address, host 70 should call SetMacAddress_Req( ) prior to invoking the initialization functions (e.g. Initialize( )).

In one embodiment, the API may be implemented as a function such as:

status SetMACAddress_Req(MacAddr, Boolean NonVolatile)

Parameter "MacAddr" is a pointer to a 6-byte IEEE MAC address. If MacAddr is NULL the response will report the current configured MAC address or the value configured in non-volatile memory (depending on the value of the non-volatile flag). Parameter "Nonvolatile" is a Boolean type which may be set to TRUE if the configuration is to be set and stored in non-volatile memory, or to FALSE if the current configuration is not to be stored in non-volatile memory.

The "status" return value indicates an error if an invalid parameter is used or okay otherwise.

i) SetMacAddress_Rsp( )

This callback is invoked asynchronously in response to SetMacAddress_Req( ) and indicates the current MAC address configuration.

In one embodiment, the callback may be implemented as a function such as:

status SetMacAddress_Rsp(MacAddr, Boolean NonVolatile)

Parameter "MacAddr" is a pointer to 6-byte IEEE MAC address. Parameter "Nonvolatile" is a Boolean type which if set to TRUE indicates that the MAC address is currently configured address in non-volatile memory, and if set to FALSE indicates that the MAC address is the currently configured address and may be different from that stored in non-volatile memory.

(k) SetTime_Req( )

According to an embodiment of the present invention, an API is provided allowing host 70 to issue a command to set or retrieve the current time of day from NP 10. NP 10 does not track the time of day when it is not powered, and so host system 70 needs to invoke this API to set the time soon after a power up or system reset.

In one embodiment, the API may be implemented as:

status SetTime_Req(TimeOfDay)

In one embodiment, the "TimeOfDay" parameter stores the current time of day expressed as seconds since midnight of Jan. 1, 1970. If "TimeOfDay" value is 0xFFFF then SetTime_Rsp( ) callback returns the time of day according to NP 10. The "status" field returns an error if an invalid parameter is used, or okay otherwise.

(l) SetTime_Rsp( )

This callback is invoked asynchronously as a result of a call to SetTime_Req( ) and indicates the current time of day as reckoned by NP 10.

In one embodiment, the callback is implemented as:

void SetTime_Rsp(TimeOfDay)

In one embodiment, the "TimeOfDay" parameter indicates the current time of day expressed as seconds since midnight Jan. 1, 1970.

(2) SONET Layer Related Commands and Responses

According to an embodiment of the present invention, various APIs are provided for accessing the physical SONET layer, both for configuration and monitoring purposes. These APIs include:

(a) PhyInit_Req( )

According to an embodiment of the present invention, an API is provided allowing host 70 to issue a command to initialize the physical layer. A call to this API initializes framer subsystem 18 with the specified parameters. If NP 10 does not support a certain type of interface, the callback in response to this command returns with the default type.

In one embodiment, the API may be implemented as a function such as:

PhyInit_Req(PhyMediumValidIntervals, PhyMediumLineCoding, PhyMediumLineType, PhyMediumCircuitIdentifier, PhyPathwidth, Boolean NonVolatile)

Parameter "PhyMediumValidIntervals" indicates the number of previous intervals for which valid data has been stored. A SONET device needs to support at least "n"

intervals where the minimum value of "n" is 4 in one embodiment. In this embodiment the default value for "n" is 32 and the maximum value is 96. The value of this object will be "n" unless the device was brought on-line within the last (n * 15) minutes, in which case the value will be a number of complete 15 minute intervals the device has been on-line.

Parameter "PhyMediumLineCoding" indicates the line coding for this interface. For example, a 0x1 may indicate MediumOther, a 0x2 may indicate MediumB3ZS, a 0x3 may indicate MediumCMI, a 0x4 may indicate MediumNRZ, a 0x5 may indicate MediumRZ. Parameter "PhyMediumLine-Type" describes the line type for this interface. For example, a value of 0x1 may indicate other, a 0x2 value may indicate ShortSingleMode, a 0x3 value may indicate LongSingleMode, a 0x4 value may indicate MultiMode, a 0x5 value may indicate coax, and a 0x6 value may indicate UTP. The "PhyMediumCircuitIndentifier" contains the transmission vendor's circuit identifier. This is an optional parameter and used for troubleshooting purposes.

The "PhyPathWidth" parameter indicates the type of the SONET/SDH path. For example, a value of 0x1 may indicate STS-1, a value of 0x2 may indicate STS3c/STM1, a value of 0x3 may indicate STS-12c/STM4, a value of 0x4 may indicate STS-24c, and a value of 0x5 may indicate STS-48c/STM16. "NonVolatile" is a Boolean which if set to TRUE indicates that the configuration is to be stored in non-volatile memory and if set to FALSE indicates that the configuration is not to be stored in non-volatile memory.

(b) PhyInit_Rsp( )

This is a callback API which is called in response to PhyInit_Req( ) and confirms the execution of the requested command. This callback returns the values of the current setting of framer subsystem 18. A default value is returned if the requested command asks for invalid configuration.

In one embodiment, the callback may be implemented as a function such as:

PhyInit_Rsp(PhyMediumValidIntervals, PhyMediumLineCoding, PhyMediumLineType, PhyMediumCircuitIdentifier, PhyPathwidth, Boolean NonVolatile)

The parameters have been described in section 2(*a*).

(c) SonetStats_Req( )

According to an embodiment of the present invention, an API is provided allowing host 70 to issue a command to request SONET statistics on a given time interval.

In one embodiment, the API may be implemented as a function such as:

SonetStats_Req(SectionIntervalNumber, LineIntervalNumber, FarEndLineIntervalNumber, PathIntervalNumber, FarEndPathIntervalNumber)

Parameter "SectionIntervalNumber" identifies the interval for which the set of statistics is requested. For example, a value of 0x0 may indicate the current time interval, and 0x1–0x60 may indicate other time intervals. The interval identified by 0x1 is the most recently completed 15 minute interval, and the interval identified by 0xN is the interval immediately preceding the one identified by 0x(N–1).

Parameter "LineIntervalNumber" identifies the line interval for which the set of statistics is requested, "FarEndLineIntervalNumber" identifies the far end line interval, "PathIntervalNumber" identifies the path interval, and "FarEndPathIntervalNumber" identifies the far end path interval. The values that each of these parameters may be set to are the same as those described for "SectionIntervalNumber" parameter.

(d) SonetStats_Rsp( )

This callback API is invoked in response to SonetStats_Req( ) and returns the SONET statistics based on the time interval requested by the SONET statistics request command (SonetStats_Req( )).

In an embodiment of the present invention, the callback may be implemented as a function such as:

void SonetStats_Rsp(MediumType, MediumTimeElapsed, MediumValidIntervals, MediumLineCoding, MediumLineType, MediumCircuitIdentifier, SectionIntervalNumber, SectionStatus, SectionESs, SectionSESs, SectionSEFSs, LineIntervalNumber, LineStatus, LineESs, LineSESs, LineUASs, FarEndLineIntervalNumber, FarEndLineESs, FarEndLineSESs, FarEndLineUASs, PathIntervalNumber, PathWidth, PathStatus, PathESs, PathSESs, PathUASs, FarEndPathIntervalNumber, FarEndPathESs, FarEndPathSESs, FarEndPathUASs)

The "MediumType" parameter identifies whether a SONET or a SDH signal is used across this interface. For example, a value of 0x0 may indicate a reserved field, a value of 0x1 may indicate SONET, a value of 0x2 may indicate SDH. The "MediumTimeElapsed" parameter indicates the number of seconds, including partial seconds, that have elapsed since the beginning of the current error-measurement period. In one embodiment this parameter may have a range of 0–99. The "Medium ValidIntervals" parameter indicates the number of previous intervals for which valid data has been stored. A SONET device must support at least "n" intervals where the minimum value of "n" is 4, the default value is 32, and the maximum value is 96. The value of this object will be "n" unless the device was brought on-line within the last ("n" * 15) minutes, in which case the value will be the number of complete 15 minute intervals the device has been on-line. The value of "n" is usually setup by calling the PhyInit_Req( ) command API.

The "MediumLineCoding" parameter describes the line coding for this interface. For example, a value of 0x1 may indicate MediumOther, a value of 0x2 may indicate MediumB3ZS, a value of 0x3 may indicate MediumCMI, a value of 0x4 may indicate MediumNRZ, and a value of 0x5 may indicate MediumRZ. The "MediumLineType" parameter describes the line type for this interface. For example, a value of 0x1 may indicate Other, a value of 0x2 may indicate ShortSingleMode, a value of 0x3 may indicate LongSingleMode, a value of 0x4 may indicate MultiMode, a value of 0x5 may indicate Coax, and a value of 0x6 may indicate UTP. The "MediumCircuitIdentifier" parameter contains the transmission vendor's circuit identifier and is used to for the purpose of facilitating troubleshooting. This is setup using the PhyInit_Req( ) command.

Parameter "SectionIntervalNumber" identifies the interval for which the set of statistics is requested. For example, a value of 0x0 may indicate the current time interval, and 0x1–0x60 may indicate other time intervals. The interval identified by 0x1 is the most recently completed 15 minute interval, and the interval identified by 0xN is the interval immediately preceding the one identified by 0x(N–1).

Parameter "LineIntervalNumber" identifies the line interval for which the set of statistics is requested, "FarEndLineIntervalNumber" identifies the far end line interval, "PathIntervalNumber" identifies the path interval, and "FarEndPathIntervalNumber" identifies the far end path interval. The values that each of these parameters may be set to are the same as those described for "SectionIntervalNumber" parameter.

Parameter "SectionStatus" indicates the status of the interface. The "SectionCurrentStatus" is a bit map represented as a sum, therefore, it can represent multiple defects simultaneously. The "SectionNoDefect" should be set if and only if no other flag is set. The various bit positions may include 0x1 indicating SectionNoDefect, 0x2 indicating SectionLOS, and 0x4 indicating SectionLOF.

The "SectionESs" parameter indicates a counter associated with the number of Errored Seconds encountered by a SONET/SDH section in the requested 15 minute interval. The "SectionSESs" parameter indicates a counter associated with the number of Severely Error Seconds encountered by a SONET/SDH section in the requested 15 minute interval. Parameter "SectionSEFSs" indicates a counter associated with the number of Severely Error Framing Seconds encountered by a SONET/SDH section in the requested 15 minute interval.

Parameter "LineStatus" indicates the status of the interface. The LineCurrentStatus is a bit map represented as a sum, therefore, it can represent multiple defects simultaneously. The LineNoDefect should be set if and only if no other flag is set. The various bit positions may include 0x1 indicating LineNoDefect, 0x2 indicating LineAIS, and 0x3 indicating LineRDI.

"LineESs" is a counter associated with the number of Errored Seconds encountered by a SONET/SDH Line in the requested 15 minute interval. "LineSESs" is a counter associated with the number of Severely Error Seconds encountered by a SONET/SDH Line in the requested 15 minute interval. "Line UASs" is a counter associated with the number of Unavailable Seconds encountered by a SONET/SDH Line in the requested 15 minute interval.

"FarEndLineESs" is a counter associated with the number of Far End Errored Seconds encountered by a SONET/SDH Line in the requested 15 minute interval. "FarEndLineSESs" is a counter associated with the number of Far End Severely Errored Seconds encountered by a SONET/SDH Line in the requested 15 minute interval. "FarEndLineUASs" is a counter associated with the number of Far End Unavailable Seconds encountered by a SONET/SDH Line in the requested 15 minute interval.

"Path Width" indicates the type of the SONET/SDH Path. For example, a value of 0x1 may indicate STS-1, a value of 0x2 may indicate STS-3c/STM1, a value of 0x3 may indicate STS-12c/STM4, a value of 0x4 may indicate STS-24c, and a value of 0x5 may indicate STS-48cISTM16. NP 10 versions may be configured using the PhyInit_Req( ) command.

"PathStatus" indicates the status of the interface. The PathCurrentStatus is a bit map represented as a sum, therefore, it can represent multiple defects simultaneously. The PathNoDefect should be set if and only if no other flag is set. In one embodiment, a bit position of 0x1 may indicate PathNoDefect, 0x2 may indicate PathSTSLOP, 0x4 may indicate PathSTSAIS, 0x8 may indicate PathSTSRDI, 0x10 may indicate PathUnequipped, and 0x20 may indicate PathSignalLabelMismatch.

"PathESs" is a counter associated with the number of Errored Seconds encountered by a SONET/SDH Path in the requested 15 minute interval. "PathSESs" is a counter associated with the number of Severely Errored Seconds encountered by a SONET/SDH Path in the requested 15 minute interval. "PathUASs" is as counter associated with the number of Unavailable Seconds encountered by a SONET/SDH path in the requested 15 minute interval.

"FarEndPathESs" is a counter associated with the number of Far End Errored Seconds encountered by a SONET/SDH Path in the requested 15 minute interval. "FarEndPathSESs" is a counter associated with the number of Far End Severely Errored Seconds encountered by a SONET/SDH Path in the requested 15 minute interval. "FarEndPathUASs" is a counter associated with the number of Far End Unavailable Seconds encountered by a SONET/SDH Path in the requested 15 minute interval.

(3) ATM Signaling Commands and Responses

According to an embodiment of the present invention, various APIs are provided for providing the functionality of the ATM Forum user to network interface (UNI) signaling standards. In one embodiment, the present invention supports the UNI 3.0, UNI 3.1, and UNI 4.0 signaling standards. Signaling typically occurs when NP 10 receives a Initialize_ Req( ) initialization command from host 70 and signaling is enabled on the physical ports of NP 10. The signaling APIs include:

(a) UniVersion_Req( )

According to an embodiment of the present invention, an API is provided allowing host 70 to issue a command to NP 10 to configure the UNI version. In an embodiment of the present invention, the API may be implemented as a function such as:

status UniVersion_Req(PortIndex, UniType, NonVolatile)

"PortIndex" indicates the index of the port whose signaling is to be set. "UniType" indicates the UNI version number, such as UNI version 3.0 or 3.1 of 4.0. If the UNI type is unspecified, the response will return either the currently configured signaling version or the configured version in non-volatile memory. The "NonVolatile" parameter is of Boolean type. When set to TRUE, the parameter indicates that the configuration is to be stored in non-volatile memory, while set to FALSE, it indicates that the configuration is not to be stored in non-volatile memory. The "status" field returns an error if an invalid port index or UNI type is specified, or okay otherwise.

(b) UniVersion_Rsp( )

This callback is invoked asynchronously in response to UniVersion_Req( ) and reports the UNI signaling version to host 70. In an embodiment of the present invention, the callback may be implemented as a function such as:

void UniVersion_Rsp(PortIndex, UniType, NonVolatile)

The parameters are as described in section 3($a$).

(c) SignalingStats_Req( )

According to an embodiment of the present invention, an API is provided allowing host 70 to issue a command to NP 10 to get signaling related statistics associated with a specified port on NP 10. In an embodiment of the present invention, the API may be implemented as a function such as:

status SignalingStats_Req(PortIndex)

"PortIndex" indicates the index of the port whose statistics are to be retrieved. The "status" field returns an error if the port index is invalid, or okay otherwise.

(d) SignalingStats_Rsp( )

This callback is invoked asynchronously in response to SignalingStats_Req( ) and returns the signaling statistics to host 70 for the specified port. In an embodiment of the present invention, the callback may be implemented as a function such as:

void SignalingStats_Rsp(PortIndex, struct signaling_ stats Stats)

"PortIndex" identifies the index of the physical port of NP 10 whose signaling statistics are retrieved. "Stats" is a data structure containing the signaling statistics. In one embodiment, the data structure may be defined as follows:

typedef struct signaling_stats

```
{
struct
    {
    /* Statistics pertaining to outgoing calls */
    uint32 out_calls_initiated;
    uint32 out_calls_completed;
    uint32 out_calls_curr_active;
    uint32 out_calls_progressing;
    uint32 out_calls_rejected;
    HJCC CAUSE last_out_call_clear_cause;
    /* Statistics pertaining to incoming calls */
    uint32 in_calls_initiated;
    uint32 in_calls_completed;
    uint32 in_calls_curr_active;
    uint32 in_calls_progressing;
    uint32 in_calls_rejected;
    CAUSE last_in_call_clear_cause;
    /* Cumulatives */
    uint32 malform_sigl_pkts_rx;
    uint32 valid_sigl_pkts_rx;
    uint32 total_sigl_pkts_tx;
    } counters;
struct
    {
    timeOut mr_out_call_initiation;
    timeOut mr_out_call_completion;
    timeOut mr_in_call_initiation;
    timeOut mr_in_call_completion;
    timeOut last_op_state_change;
    } timestamps;
uint32 op_state;
} SIGL STAT;
```

(e) SaalStats_Req( )

According to an embodiment of the present invention, this API allows host 70 to issue a command to NP 10 to get the signaling ATM adaptation layer (SAAL) statistics associated with a physical port of NP 10. In an embodiment of the present invention, the API may be implemented as a function such as:

status SaalStats_Req(PortIndex)

"PortIndex" indicates the index of the port whose SAAL statistics are to be retrieved. The "status" field returns an error if input port index is invalid, or okay otherwise.

(f) SaalStats_Rsp( )

This callback is invoked asynchronously in response to SaalStats_Req( ) and returns the SAAL statistics for a specified port. The SAAL statistics are returned in a data structure.

In one embodiment, the callback may be implemented as a function such as:

void SaalStats_Rsp(PortIndex, saal_stats Stats)

"PortIndex" indicates the index of the port whose SAAL statistics are retrieved. The Stats data structure contains the SAAL statistics. In one embodiment, this data structure may include:

```
typedef struct saal_stats
{
/**** Statistics ****/
uint32 s_pdu_counts[SSCOP_MAX_PDUS];
uint32 retx_pdu_count;
uint32 retx_sd_pdu count;
uint32 rpdu_counts[SSCOP_MAX_PDUS];
uint32 r_inapprop_count;    /* Inappropriate PDU
    Received [A-M] */
uint32 max_retx_count;    /* Max Retransmissions
    Count reached /
uint32 tmr_norsp_exp_count;    /* No response timer
    expired */
uint32 sd_poll_seq_err_count;    /*SD or POLL
    sequence number error */
uint32 stat_seq_errcount;    /* STAT poll sequence
    number error */
uint32 stat_rx_seq err count;    /* STAT received
    sequence number error */
uint32 ustat_rx_seq_err_count;    /* USTAT received
    sequence number error */
uint32 pdu_type_viol_Count;    /* PDU Type violation
    */
uint32 pdu_len_viol_count;    /* PDU length violation
    */
uint32 sd_pdus_retx_count;    /* SD POUs require
    ReTx */
} SSCOP_STAT;
```

(4) ILMI Commands and Responses

According to an embodiment of the present invention, various APIs are provided for implementing the ATM Forum Interim Local Management Interface (ILMI) protocol for addressing and management. These APIs include:

(a) ILMIEnable_Req( )

According to an embodiment of the present invention, this API allows host 70 to issue a command to NP 10 to enable ILMI on a specified port of NP 10. In one embodiment, in the default mode, ILMI is enabled on all the physical ports of NP 10. In an embodiment of the present invention, the API may be implemented as a function such as:

status ILMIEnable_Req(PortIndex, NonVolatile)

The "PortIndex" parameter indicates the index of the NP port to be affected. The "NonVolatile" parameter is a boolean. When set to TRUE, the parameter indicates that the configuration is to be stored in non-volatile memory, while set to FALSE, it indicates that the configuration is not to be stored in non-volatile memory. The "status" field returns an error if an invalid port index is used, or okay otherwise.

(b) ILMIEnable_Rsp( )

This callback indicates the ILMI configuration on a specified port. In an embodiment of the present invention, the callback may be implemented as a function such as:

status ILMIEnable_Req(PortIndex, NonVolatile)

The parameters have been described in the section 4(*a*).

(c) ILMIDisable_Req( )

According to an embodiment of the present invention, this API allows host 70 to issue a command to NP 10 to disable ILMI on a specified port of NP 10. As a result of disabling ILMI, host 70 has to explicitly configure the port parameters such as UNI version, SONET/SDH mode, ATM network address prefix, LECS address, etc. In an embodiment of the present invention, the API may be implemented as a function such as:

status ILMI_Disable_Req(PortIndex, Prefix, NonVolatile)

The "PortIndex" parameter indicates the index of the NP port whose ILMI is to be disabled. The "Prefix" parameter indicates the ATM address prefix to be used. The "NonVolatile" parameter is a boolean. When set to TRUE, the parameter indicates that the configuration is to be stored in non-volatile memory, while set to FALSE, it indicates that the configuration is not to be stored in non-volatile memory. The "status" field returns an error if an invalid port index is used, or okay otherwise.

(d) ILMI Disable_Rsp( )

This callback is invoked asynchronously in response to ILMIDisable_Req( ) and confirms the ILMI configuration for the specified port of NP 10. In an embodiment of the present invention, the callback may be implemented as a function such as void ILMIDisable_Rsp(PortIndex, Prefix, NonVolatile)

The parameters have been described in section 4(c).

(e) ILMIQuery_Req( )

According to an embodiment of the present invention, this API allows host 70 to issue a command to query the ILMI configuration for a specified port. In an embodiment of the present invention, the API may be implemented as a function such as:

status ILMIQuery_Req(PortIndex, NonVolatile)

The parameters have been described above in section 4(c). The "status" field returns an error if an invalid port index is used, or okay otherwise.

(f) ILMIQuery_Rsp( )

This API callback from NP 10 to host 70 reports the ILMI configuration for a specified port. In an embodiment of the present invention, the callback may be implemented as a function such as:

status ILMIQuery_Rsp(PortIndex, boolean NonVolatile, Boolean ILMIEnabled, NetPrefix)

The "PortIndex" parameter indicates the index of the NP port whose ILMI configuration is queried. The "NonVolatile" parameter is a boolean. When set to TRUE, the parameter indicates that the configuration is to be stored in non-volatile memory, while set to FALSE, it indicates that the configuration is not to be stored in non-volatile memory. The "ILMIEnabled" boolean parameter when set to TRUE indicates that the specified ILMI is enabled on the specified port identified by "PortIndex," while when set to FALSE indicates that ILMI has been disabled for the specified port. The "NetPrefix" parameter is a pointer to the ATM network prefix if ILMI has been disabled. The "status" field returns an error if an invalid parameter is used, or okay otherwise.

(g) LinkState_Ind( )

This callback is invoked asynchronously by NP 10 whenever there is a change in the link state of the physical NP ports. In an embodiment of the present invention, the callback may be implemented as a function such as:

void LinkState_Ind(PortIndex, Event)

The "PortIndex" parameter indicates the index of the NP port whose link state has changed. The "Event" parameter indicates the change which occurred. For example, the "Event" parameter may indicate that the link is up or down or that ILMI needs a cold start.

(h) ILMIStats_Req( )

According to an embodiment of the present invention, this API allows host 70 to issue a command to NP 10 to get the ILMI related statistics for a specified port. In an embodiment of the present invention, the API may be implemented as a function such as:

status ILMIStats_Req(PortIndex)

The "PortIndex" parameter indicates the index of the NP port whose ILMI statistics are to be retrieved. The "status" field returns an error if an invalid port index is used, or okay otherwise.

(i) ILMIStats_Rsp( )

This callback is invoked asynchronously in response to ILMIStats_Req( ) issued by host 70 in order to retrieve ILMI statistics for the specified port. In an embodiment of the present invention, the callback may be implemented as a function such as:

ILMIStats_Rsp(PortIndex, struct ilmi_stats Stats)

The "Portindex" parameter indicates the index of the NP port whose ILMI statistics are retrieved. The "Stats" parameter is a data structure which contains the statistics for the port. In one embodiment, the data structure includes:

```
typedef struct ilmi_stats
{
    uint32 snmpInPkts; uint32 snmpOutPkts;
    uint32 snmpInBadVersions;
    uint32 snmpInBadCommunityNames;
    uint32 snmpInBadCommunityUses;
    uint32 snmpInASNParseErrs; uint32 snmpInBad-
        Types;
    uint32 snmpInTooBigs; uint32 snmpInNoSuch-
        Names;
    uint32 snmpInBadValues; uint32 snmpInReadOnlys;
    uint32 snmpInGenErrs; uint32 snmpInTotalReq-
        Vars;
    uint32 snmpInTotalSetVars; uint32 snmpInGetRe-
        quests;
    uint32 snmpInGetNexts; uint32 snmpInSetRequests;
    uint32 snmpInGetResponses; uint32 snmpInTraps;
    uint32 snmpOutTooBigs; uint32 snmpOutNoSuch-
        Names;
    uint32 snmpOutBadValues; uint32 snmpOutRea-
        dOnlys;
    uint32 snmpOutGenErrs; uint32 snmpOutGetRe-
        quests;
    uint32 snmpOutGetNexts; uint32 snmpOutSetRe-
        quests;
    uint32 snmpOutGetResponses; uint32 snmpOut-
        Traps;
    uint32 snmpEnableAuthTraps;
}ILMI_STATS.
```

(5) LANE Related Commands and Responses

According to an embodiment of the present invention, various APIs are provided for providing LANE functionality. NP 10 supports LANE host software and also implements a hardware assisted LANE emulation client (LEC) data path. Parameters related to the LANE functionality may be stored in flash memory on NP 10. During power up of NP 10, all pre-configured LECs are brought up soon after ILMI registration is completed and ATM signaling is up. The APIs include:

(a) CreateLEC_Req( )

According to an embodiment of the present invention, this API allows host 70 to issue a command to NP 10 to create a LANE emulation client (LEC) or to query the configuration of an existing LEC. The API requests the creation of a LEC and associates the LEC with a given virtual LAN (VLAN) ID. Alternatively, the API may query the configuration of an existing LEC. Once created the LEC attempts to join the emulation LAN (ELAN). Traffic will only be forwarded onto the ELAN once the join process has completed successfully. The state of the LEC will be reported via the asynchronous LecState_Ind( ) callback. In an embodiment of the present invention, the API may be implemented as a function such as:

status CreateLEC_Req(LECIndex, struct lec_config Config, boolean NonVolatile)

The "LECIndex" parameter identifies the NP 10 LEC index which in one embodiment is in the range 1–64 (aggregate for all ports). The "Config" parameter is a pointer to a data structure containing LEC configuration parameters. If "Config" is NULL, no LEC will be created but the callback response may contain the configuration of the requested LEC. The "NonVolatile" parameter is a boolean. When set to TRUE, the parameter indicates that the LEC configuration is to be stored in non-volatile memory, while set to FALSE, it indicates that the LEC configuration is not to be stored in non-volatile memory. The "status" field returns an error if an invalid parameter is used, or okay otherwise.

According to an embodiment of the present invention, the data structure pointed to by "Config" may include:

```
typedef struct lec_config
{
    int PortIndex, int LogicalPortIndex, int VlanId,
    char *LecDes, char *ElanName, atmAddr *Lecs,
    atmAddr *Les, int CtlRsp, int MaxUnkFrameCnt,
    int MaxUnkFrameTime, int VccTimeOut,
    int MaxArpRetry, int ArpAge, int ArpRsp,
    int FlushTimeOut, int CfgRetry, int JoinRetry,
    int RegRetry, int MaxDataDirectVcc
};
```

"PortIndex" indicates the ATM port number. "LogicalPortIndex" identifies the logical host port associated with the LEC. "VlanID" indicates the VLAN to which the LEC belongs. "LecDes" is a LEC description ASCII string. "ElanName" indicates the ELAN name string. "Lecs" indicates the ATM address of the LECS. In one embodiment, a −1 value of "lecs" may indicate that a LECS does not exist, and a zero or null value may indicate that ILMI is need to locate the LECS address. "Les" indicates the ATM address of LES. "CtlRsp" indicates the LANE control request/reply time out value and may range in one embodiment from 1–60 seconds. "MaxUnkFrameCnt" indicates the maximum unknown frame count and may range in one embodiment from 1–10. "MaxUnkFrameTime" indicates the maximum unknown frame time and may range in one embodiment from 1–60. "VccTimeOut" indicates the data direct VCC inactivity timeout value, and may range in one embodiment from 180-unlimited seconds. "MaxArtpRetry" indicates the LE_ARP maximum retry count and may range in one embodiment from 1–10. "ArpAge" indicates the LE_ARP entry aging time and may range in one embodiment from 10–300 seconds. "ArpRsp" indicates the LE_ARP response time and may range in one embodiment from 1–30 seconds. "FlushTimeOut" indicates the time limit to wait flush response after request and may range in an embodiment from 1–4 seconds. "CfgRetry" indicates the maximum number of LECS connection retries and may range in one embodiment from 3-unlimited. "JoinRetry" indicates the maximum number of LES join retries and may range in one embodiment from 3-unlimited. "RegRetry" indicates the maximum number of register/unregister retries and may range in one embodiment from 3-unlimited. "MaxDataDirectVcc" indicates the maximum number of data direct Vcc and may range in one embodiment from 3–1024. It should be apparent to one of ordinary skill in the art that alternative data structures for storing the LEC configuration information may have more or less information than shown above.

(b) CreateLEC_Rsp( )

This callback is invoked asynchronously as a result of a host call to CreateLEC_Req( ). The evolving LEC state is reported through the asynchronously callback LECState_Ind( ). In an embodiment of the present invention, the callback may be implemented as a function such as:

void CreatLEC_Rsp(Status, LecIndex, struct lec_config Config)

The "Status" parameter indicates if the LEC was successfully created or not. "LecIndex" parameter indicates the NP LEC index and may range in one embodiment from 1–64. "Config" stores the location of the data structure containing the LEC parameters. This data structure has been described in section 5(a). The "NonVolatile" parameter is a boolean. When set to TRUE, the parameter indicates that the configuration is read from or stored to non-volatile memory, while set to FALSE, it indicates that the configuration is not stored or read from non-volatile memory.

(c) ModifyLEC_Req( )

According to an embodiment of the present invention, this API allows host 70 to issue a command to NP 10 to modify an existing LEC. In an embodiment of the present invention, the API may be implemented as a function such as:

status ModifyLEC_Req(LecIndex, struct lec_config Config, Boolean NonVolatile)

"LecIndex" identifies the index of the LEC to be modified. "Config" stores the modified configuration parameters for the LEC. The data structure pointed to by "Config" has been previously described in section 5(a). The "NonVolatile" parameter is a boolean. When set to TRUE, the parameter indicates that the LEC configuration is to be stored in non-volatile memory, while set to FALSE, it indicates that the LEC configuration is not to be stored in non-volatile memory.

(d) ModifyLEC_Rsp( )

This callback is invoked asynchronously in response to ModifyLEC_Req( ) and indicates that the specified LEC has been modified. In an embodiment of the present invention, the callback may be implemented as a function such as:

void ModifyLEC_Rsp(Status, Lecindex, struct lec_config Config)

"Status" may indicate a successful modification of the LEC or may indicate error otherwise. The other parameters are as previously described in section 5(c).

(e) DeleteLEC_Req( )

According to an embodiment of the present invention, this API allows host 70 to issue a command to NP 10 to delete a previously created LEC. A call to this API releases all of the resources associated with the LEC including all of its virtual circuits. In an embodiment of the present invention, the API may be implemented as a function such as:

status DeleteLEC_Req(LecIndex)

"LecIndex" indicates the index of a previously created LEC to be deleted. The "status" field returns an error if an invalid parameter is used, or okay otherwise.

(g) LECState_Ind( )

This callback API is invoked asynchronously by NP 10 to inform host 70 of changes to the state of a previously created LEC. In an embodiment of the present invention, the callback may be implemented as a function such as:

void LECState_Ind(LecIndex, lec_event Event)

"LecIndex" indicates the LEC whose state change is reported. "Event" indicates the change. For example, "Event" may indicate that the LEC is now ready to accept Ethernet traffic, or that the LEC is down and is not able to pass traffic.

(h) LECStats_Req( )

According to an embodiment of the present invention, this API allows host 70 to issue a command to NP 10 to retrieve LEC statistics for a specified LEC identified by a port index. In an embodiment of the present invention, the API may be implemented as a function such as:

status LECStats_Req(PortIndex)

"PortIndex" indicates the index to the port whose LEC statistics are to be retrieved. The "status" field returns an error if an invalid index is used, or okay otherwise.

(i) LECStats_Rsp( )

This callback is invoked asynchronously as a result of a call to LECSTats_Req( ) and reports the statistics associated with a specified LEC. In an embodiment of the present invention, the callback may be implemented as a function such as:

LECStats_Rsp(LecIndex, struct lec_stats Stats)

"LecIndex" identifies the index of the LEC whose statistics are retrieved. "Stats" is a data structure containing the LEC statistics. In one embodiment, the data structure includes:

```
typedef struct lec_stats
{
  /* LEC Stats */
  uint32 data_vcc_cumu; /* The number of data direct VCCs */
  uint32 data_vcc_curr; /* The number of ACTIVE data direct VCCs. */
  uint32 data_vcc_bumps; /* The number of bumped data VCCs. */
  uint32 data_vcc_idles; /* The number of idled data VCCs */
  uint32 data_vcc_failures; /* The number of data VCCs connect failures */
  uint32 svc_failures; /* Total SVC failures */
  /* LEC Data and Ctrl Frame Stats */
  uint32 octets_in; /* Total # of octets received */
  uint32 errors in; /* Count of error frames received */
  uint32 discards_in; /* Count of received frames discarded */
  uint32unknowns_in; /* Number of unknown protocol frames received */
  uint32 octets_out; /* Total number of octets sent */
  uint32 discards_out; /* Count of sent frames discarded */
  uint32 errors_out; /* Count of error frames sent */
  /* LEC Data Frame Traffic Stats */
  uint32 data_frames_in; /* Total number of data frames received */
  uint32 data_ucasts_in; /* Count of Unicast frames received */
  uint32 data_nucasts_in; /* Count of Non-Unicast frames received
  uint32 data_frames_out; /* Total number of data frames sent */
  uint32 data_ucasts_out; /* Count of Unicast frames sent */
  uint32 data_nucasts_out; /* Count of Non-Unicast frames sent */
  /** LEC Control Frame Traffic Stats **/
  uint32 ctrl_ins; /* Total control frames received */
  uint32 ctrl_in_types[LCOC_XT_LI * LCOC_XT_HI];
  /* Individual ctrl frame types received */
  uint32 ctrl_in_errors; /* Error control frames received */
  uint32 ctrl_in_success; /* Number of control frames received with success */
  uint32 ctrl in failures; /* Control frames received without success */
  uint32 ctrl outs; /* Total control frames sent */
  uint32 ctrl_out_types[LCOC_XT_LI * LCOC_XT_HI];
  /* Individual frame types sent */
  uint32 ctrl_out_success; /* Number of control frames sent with success */
  uint32 ctrl_out_failures; /* Number of control frames sent without success */
  uint32 ctrl_no_responses; /* Number of control frames that timed out */
  /**** LE_ARP Stats ****/
  uint32 le_arp_in_requests; /* Total Requests received */
  uint32 le_arp_in_replies; /* Total Replies received */
  uint32 le_arp_out_requests; /* Total Requests sent */
  uint32 le_arp_out_replies; /* Total Replies sent */
  uint32 le_arp_in_unknowns;/* Number of unknown MAC_ADDR */
  uint32 le_arp_in_sourceBcasts; /* Number of source broadcasts */
  uint32 le_arp_in_duplicates; / Number of received frames with src=my addr */
  uint32 le_arp_in_errors; /* Received frames with general error */
  uint32 le_arp_out_proxys; /* Proxy MAC_ADDRs answered */
  uint32 le_arp_no_responses; /* Requests that timed out */
  uint32 le_arp_age_outs; /* Number of aged entries */
}.
```

(6) Layer 2 Bridging Commands and Responses

According to an embodiment of the present invention, various APIs are provided for providing partial Layer 2 bridging functionality. In one embodiment, each LEC represents a logical port to host system 70 and can be placed in disabled, listening, learning, forwarding states as per the 802.1*d* spanning tree protocol standard. NP 10 may also implement a hardware-based bridge table that allows for source address learning and filtering as well as destination address resolution. The APIs providing bridging functionality include:

(a) AddBridgeEntry_Req( )

According to an embodiment of the present invention, this API allows host 70 to issue a command to update the NP 10 forwarding table or bridge table. Generally, this is a result of host 70 responding to a UnknownDestination_Ind( ) callback invoked by NP 10 when it receives a unicast frame that it cannot resolve. Host 70 may also use this API function to add a static entry into the forwarding table by setting up the non-volatile flag. In an embodiment of the present invention, the API may be implemented as a function such as:

status AddBridgeEntry_Req(VlanID, Port, PtrMacAddr)

The "VlanID" parameter indicates the VLAN number of the resolved MAC address. The "Port" parameter indicates the logical or physical port number of the resolved MAC address. The "PtrMacAddr" parameter is a pointer indicating the source MAC address which has been resolved by host 70. The "status" field returns an error if an invalid parameter is used, or okay otherwise.

(b) DeleteBridgeEntry_Req( )

According to an embodiment of the present invention, this API allows host 70 to issue a command to NP 10 to delete a MAC entry which was originally learned from other switch elements and which is now out of date. This API accordingly allows host 70 to maintain system wide Layer 2 forwarding integrity. This API may also be used to clear a static entry. In an embodiment of the present invention, the API may be implemented as a function such as:

int DeleteBridgeEntry_Req(VlanID, PtrMacAddr)

The "VlanID" parameter indicates the VLAN number of the MAC address to be deleted. The "PtrMacAddr" parameter is a pointer to the MAC address to be deleted. The "status" field returns an error if an invalid parameter is used, or okay otherwise.

(c) FlushBridgeTable_Req( )

The Ethernet topology changes due to VLAN port configuration or automatic spanning tree discovery and triggers a reaction to flush the MAC entries related to the affected VLAN. This API allows host 70 to flush learned MAC entries for this VLAN. NP 10 uses the timeout value passed as a parameter to this API and compares it with the age value of each MAC entry maintained for that VLAN. If the age value is younger, then time out is flushed and the age value replaced by a flush timeout. If the age of the MAC entry is older, then flush time out, the entry will be deleted. All resulting deletions are reported to host through FlushBridge_Rsp( ). In an embodiment of the present invention, the API may be implemented as a function such as:

void FlushBridge_Req(VlanID, TimeOut)

The "VlanId" parameter identifies the VLAN number associates with MAC entries which need to be flushed. The "TimeOut" parameter indicates a flush time out value.

(d) FlushBridge_Rsp( )

This callback is invoked asynchronously in response to FlushBridge_Req( ) and returns all immediate aged entries. Other aged entries after the flush may be reported to host 70 through AgedMac_Ind( ) individually. In an embodiment of the present invention, the callback may be implemented as a function such as:

void FlushBridge_Rsp(Addr, Count)

The "Addr" parameter identifies an array of MAC addresses being deleted due to the flush request. The "Count" parameter indicates the number of entries associated with the array.

(e) NewMac_Ind( )

This callback function from NP 10 informs host 70 of a newly learned MAC address for a source which NP 10 may have discovered from a particular ELAN. In one embodiment, this callback may only be generated while the LEC is in the appropriate bridging state. In an embodiment of the present invention, the callback may be implemented as a function such as:

void NewMac_Ind(Addr, VlanID)

The "Addr" parameter identifies a source MAC address for a newly discovered source. The "VlanID" parameter identifies the VLAN number of the newly learnt MAC source.

(f) AgedMac_Ind( )

NP 10 maintains bridge entries discovered by itself and uses the LEC_ARP age value associated with the LEC as the value for aging these entries. This callback function allows NP 10 to inform host 70 that a MAC entry has expired and should be removed from any distribution forwarding tables. In an embodiment of the present invention, the callback may be implemented as a function such as:

void AgedMac_Ind(Addr, VlanID)

The "Addr" parameter identifies a source MAC that has expired. The "VlanID" parameter identifies the VLAN number of the expired MAC source.

(g) PortStateChange_Req( )

According to an embodiment of the present invention, this API allows host 70 to issue a command to change the status of a particular port. NP 10 bridge mechanism keeps track of the forwarding state of all destination ports as well as the local LEC forwarding state. Local learning and forwarding only occurs if the LEC is in the appropriate bridging state. Ingressing packets that resolve to destination ports that are not in the forwarding state are dropped within NP 10. In an embodiment of the present invention, the API may be implemented as a function such as:

void PortChange_Req(LogicalPortIndex, State)

The "LogicalPortIndex" parameter indicates the logical port index of the affected port. For example, a first value of the LogicalPortIndex may indicate that the port is currently disabled, a second value may indicate that the port is currently in listening state, a third value may indicate that the port is currently in learning state, a fourth value may indicate that the port is currently in a forwarding state, and a fifth value may indicate that the port is currently in blocking state.

(h) PortStateChange_Rsp( )

This command API is initiated by NP 10 to host 70 to notify host 70 about the acceptance of changes made due to a PortStateChange_Req( ). In an embodiment of the present invention, the API may be implemented as a function such as:

void PortChangeState_Rsp(LogicalPortIndex, State)

The parameters have been described above in section 6(g).

(i) VlanInfo_Req( )

According to an embodiment of the present invention, an API is provided allowing host 70 to issue a command to inform NP 10 about host logical ports that are associated with a particular VLAN and a particular LEC. In an embodiment of the present invention, the API may be implemented as a function such as:

void VlanInfo_Req(VlanID, PortMaskLow, PortMaskHi)

The "VlanID" parameter indicates a 12 bit VLAN identifier which in one embodiment is in the range 1–4 K. The "PortMaskLow" parameter is a low word of 64 bit port mask indicating which logical ports are participating in the specified VLAN. In one embodiment, bit 0 corresponds to logical port 1 and bit 15 corresponds to logical port 16. NP 10 uses this information to broadcast ingressing traffic that has an unknown destination, multicast or broadcast MAC address. The "PortMaskHi" parameter is a high work of 64 bit port mask indicating which logical ports are participating in the specified VLAN. In one embodiment bit 0 corresponds to logical port 17, and bit 15 corresponds to logical port 64.

(j) VlanInfo_Rsp( )

This command API is used by NP 10 to confirm the acceptance of the VlanInfo_Req( ) command. In an embodiment of the present invention, the API may be implemented as a function such as:

void VlanInfo_Rsp(VlanId, PortMaskLow, PortMaskHi)

The parameters have been described in section 6(j).

(7) System Facilities Commands and Responses

According to an embodiment of the present invention, various APIs are provided for system facilities functionality. These APIs include:

(a) SysLog_Ind( )

This callback allows NP 10 to report significant events happening on NP 10 to host system 70. In an embodiment of the present invention, the callback may be implemented as a function such as:

void SysLog_Ind(SysLogMsg)

The "SysLogMsg" parameter points to the location of a null terminated string to be included in the system log. The contents of the string may change asynchronously once the callback has exited.

(b) SysKeepAlive_Req( )

According to an embodiment of the present invention, this API allows host 70 to issue a command to monitor if NP 10 is active and alive. Accordingly, this API is used for sanity monitoring of NP 10. If the SysKeepAlive_Rsp( ) is not invoked in response to this API call within a reasonable time delay, host 70 may assume that NP 10 is malfunctioning. In an embodiment of the present invention, the callback may be implemented as a function such as:

status SysKeepAlive_Rsq( )

(c) SysKeepAlive_Rsp( )

This callback is invoked asynchronously in response to SysKeepAlive_Req( ) and indicates the functioning status of NP 10 to host system 70. If the SysKeepAlive_Rsp( ) is not invoked in response to this API call within a reasonable time delay, host 70 may assume that NP 10 is malfunctioning. In an embodiment of the present invention, the callback may be implemented as a function such as:

void SysKeepAlive_Rsp( )

(8) System Diagnostics Commands and Responses

According to an embodiment of the present invention, various APIs are provided for system diagnostics functions. These APIs include:

(a) Diagnostics_Req( )

According to an embodiment of the present invention, an API is provided allowing host 70 to issue a command to NP diagnostic suite. These diagnostics cannot be un while NP 10 is in normal operational mode since the memory tests would erase the data structures, CAM 32 table entries, etc. In an embodiment of the present invention, the API may be implemented as a function such as:

status Diagnostic_Req(Level, Verify)

The "Level" parameter indicates the level of diagnostics to be run. The various levels may include running memory tests, testing the internal loopback, testing the loopback at the UTOPIA interface, testing loopback at optical port, or performing all diagnostics. The "Verify" parameter indicates if a loopback test is being performed, indicated by "Verify" being set to 1. The received data will then be verified with the original data that was transmitted. This is a processor-intensive operation. The "status" field returns an error if an invalid parameter is used, or okay otherwise.

(b) DiagnosticsComplete_Rsp( )

This API callback indicates that the diagnostic suite has been completed. As previously mentioned, NP 10 provides a range of diagnostic suites. This callback summarizes the status of the diagnostics suite. In an embodiment of the present invention, the API may be implemented as a function such as:

void DiagnosticsComplete_Rsp(LoopBackStatus, MemoryStatus)

The "LoopBackStatus" parameter is a bit-mapped status word which indicates which loopback tests failed. If the status is a non-zero value, then one or more of the tests may have failed. For example, a 0x1 value may indicate the failure of the UTOPIA loopback test, while a 0x2 value may indicate failure of the fiber loopback test. The "MemoryStatus" parameter is a bit-mapped status word which indicates which memory devices failed. In one embodiment, there are 17 internal memories in processor engine subsystem 16. Accordingly, bits 0 to 16 of this parameter may be used to correspond to the 17 memories and indicate errors if any. Similarly, other bits of this parameter may be used to indicate errors in other memory systems of NP 10, for example the RAMs and CAM 32.

(9) Network Management Commands and Responses

According to an embodiment of the present invention, various APIs are provided which allow a host 70 based SNMP manager to proxy for the embedded SNMP manager residing on NP 10. These APIs provided an alternative management interface to NP 10 and off-load the task of implementing some standard MIBs from host 70. These APIs include:

(a) SnmpState_Req( )

According to an embodiment of the present invention, an API is provided allowing host 70 to issue a command to set or query the state of the embedded SNMP manager. The SNMP manager is disabled by default.

In an embodiment of the present invention, the API may be implemented as a function such as:

status SnmpState_Req(State, NonVolatile)

The "State" parameter identifies the type of request. For example, a first value of "State" may request return of the SNMP manager configuration, a second value may indicate enabling of the SNMP manager, and a third value may indicate that the SNMP manager should be disabled. The "NonVolatile" parameter has been described above. The "status" field returns an error if an invalid parameter is used, or okay otherwise.

(b) SnmpState_Rsp( )

This callback is asynchronously invoked in response to the SnmpState_Req( ) command API and reports the current state or the configured state in non-volatile memory for the embedded SNMP manager.

In an embodiment of the present invention, the callback may be implemented as a function such as:

void SnmpState_Rsp(State, NonVolatile)

The "State" parameter returns the current state of the SNMP manager. Possible values of the "State" parameter have been described with reference to the SnmpState_Req( ) API. The "NonVolatile" parameter has been described above.

(c) TxSnmpPdu_Req( )

According to an embodiment of the present invention, an API is provided allowing host 70 to issue a command to send a SNMP PDU to the NP 10 SNMP manager. NP 10 may implement a full SNMP manager which provides access to a number of standard MIBs. This capability avoids the necessity of host system 70 to replicate these MIBs by acting as a proxy manager for NP 10 embedded manager.

In an embodiment of the present invention, the API may be implemented as a function such as:

Status TxSnmpPdu_Req(Pdu, Length)

The "Pdu" parameter is a pointer to the buffer holding the pdu to be transmitted. The "Length" parameter indicates the length of the pdu to be transmitted. The "status" field returns an error if an invalid parameter is used, or okay otherwise.

(d) RxSnmpPdu_Ind( )

This callback is asynchronously invoked to transfer a SNMP pdu from NP 10 to host system 70. In an embodiment of the present invention, the callback may be implemented as a function such as:

Void RxSnmpPDU_Ind(Pdu, Length)

The "Pdu" and "Length" parameters have been described in section 9(c).

Although specific embodiments of the invention have been described, various modifications, alterations, alternative constructions, and equivalents are also encompassed within the scope of this application. For example, the structure of network processor 10 is not limited to the embodiment shown in FIG. 1. Alternate configurations of network processor 10 having more or less subsystems than the embodiment depicted in FIG. 1 are also within the scope of the present invention. In other embodiments, the subsystems of network processor 10 may be combined into one or more subsystems or distributed across multiple subsystems. For example, memory subsystems 24 and 26 may be combined into one memory subsystem. Further, the names given to the subsystems do not in any way limit the functional scope of the subsystems. Likewise, the names given to the various APIs are not meant to in any manner reduce the scope of the functions performed by the APIs. Each API may have more or less parameters than those described above. Further, the data structure parameters to the APIs may also have more or less information than those described above. Further, the present invention is not limited to the APIs described above. Alternate embodiments of the present invention may provide more or less APIs than described above, or may provide APIs which are combinations or permutations of the APIs described above.

The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware or only in software or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. In a network environment including a host system coupled to a network processor, the host system executing a host application program, a method for allowing the host application to control the network processor, the method comprising:
    providing a first control program, the first control program providing a first plurality of application programming interfaces (APIs);
    calling a first API with a first parameter list from the first plurality of APIs, the first API being invoked by the host application for performing a first function on the network processor;
    communicating the first API and the associated first parameter list from the host system to the network processor;
    executing a second control program on the network processor, the second control program providing a second plurality of APIs;
    translating the first API and the first parameter list to at least one API from the second plurality of APIs; and
    performing the first function using the at least one API from the second plurality of APIs;
    asynchronously invoking a callback API in response to the first API call at the network processor, the callback API including a second parameter list; and
    communicating the callback API and the associated second parameter list from the network processor to the host system.

2. The method of claim 1 wherein the first function resets the network processor, and wherein the parameter list includes a parameter indicating the type of reset.

3. The method of claim 1 wherein the network processor comprises a processing engine subsystem, and wherein the first function resets a receiver module and a transmitter module within the processing engine subsystem.

4. The method of claim 1 wherein the first function performs initialization to establish communication between the host system and the network processor.

5. The method of claim 1 wherein the first function downloads a software image from the host system to the network processor.

6. The method of claim 1 wherein the network processor includes a plurality of memory banks, and wherein the first function downloads a software image from the host system to the network processor to a memory bank from the plurality of memory banks indicated by a parameter in the first parameter list.

7. The method of claim 1 wherein the network processor includes a plurality of flash memory banks, and wherein the first function configures a memory bank from the plurality of flash memory banks to be used for booting the network processor, the memory bank being identified by a parameter in the first parameter list.

8. The method of claim 1 wherein the first function configures the network processor with a media access control (MAC) address indicated by a parameter in the first parameter list.

9. The method of claim 8 wherein the second parameter list includes a parameter indicating MAC address of the network processor.

10. The method of claim 1 wherein the first function sets a time of the network processor to a time indicated by a parameter in the first parameter list.

11. The method of claim 1 wherein the first function initializes a physical layer associated with the network processor based on a first parameter and a second parameter included in the first parameter list, the first parameter indicating a line coding type and the second parameter indicating a type of SONET/SDH path.

12. The method of claim 1 wherein the first function requests statistics for a SONET layer associated with the network processor for a time interval indicated by a parameter in the first parameter list.

13. The method of claim 12 wherein the second parameter list includes a memory structure as a parameter, the memory structure storing the requested statistics for the SONET layer associated with the network processor.

14. The method of claim 1 wherein the first function configures the network processor to a user to network interface (UNI) version indicated by a parameter in the first parameter list.

15. The method of claim 1 wherein the first function requests signaling statistics associated with a port of the network processor identified by a parameter in the first parameter list.

16. The method of claim 15 wherein the second parameter list includes a memory structure as a parameter, the memory structure storing the requested signaling statistics for the port of the network processor.

17. The method of claim 1 wherein the first function requests signaling ATM adaptation layer (SAAL) statistics associated with a port of the network processor identified by a parameter in the first parameter list.

18. The method of claim 17 wherein the second parameter list includes a memory structure as a parameter, the memory structure storing the requested SAAL statistics for the port of the network processor.

19. The method of claim 1 wherein the first function enables interim local management interface (ILMI) on a port of the network processor identified by a parameter in the first parameter list.

20. The method of claim 1 wherein the first function disables interim local management interface (ILMI) on a port of the network processor identified by a parameter in the first parameter list.

21. The method of claim 1 wherein the first function queries interim local management interface (ILMI) configuration on a port of the network processor identified by a parameter in the first parameter list.

22. The method of claim 21 wherein the second parameter list includes a memory structure as a parameter, the memory structure storing the queried ILMI configuration for the port of the network processor.

23. The method of claim 1 wherein the first function requests interim local management interface (ILMI) statistics for a port of the network processor identified by a parameter in the first parameter list.

24. The method of claim 23 wherein the second parameter list includes a memory structure as a parameter, the memory structure storing the requested ILMI statistics for the port of the network processor.

25. The method of claim 1 wherein the first function creates a LAN emulation client (LEC) based on configuration information stored in a parameter of the first parameter list, and associates the created LEC with a virtual LAN identifier (VLAN ID).

26. The method of claim 1 wherein the first function queries a configuration of an existing LAN emulation client (LEC).

27. The method of claim 26 wherein the second parameter list includes a memory structure as a parameter, the memory structure storing the queried LEC configuration information.

28. The method of claim 1 wherein the first function modifies an existing LAN emulation client (LEC) according to configuration information stored in a parameter of the first parameter list.

29. The method of claim 1 wherein the first function deletes an existing LAN emulation client (LEC).

30. The method of claim 1 wherein the first function requests LAN emulation client (LEC) statistics for a LEC of the network processor identified by a parameter in the first parameter list.

31. The method of claim 30 wherein the second parameter list includes a memory structure storing the requested LEC statistics.

32. The method of claim 1 wherein the first function adds an entry to forwarding and bridge tables stored by the network processor.

33. The method of claim 1 wherein the first function deletes a media access control (MAC) entry indicated by a first parameter in the parameter list from forwarding and bridge tables stored by the network processor.

34. The method of claim 1 wherein:
the first function flushes media access control (MAC) entries from forwarding and bridge tables stored by the network processor; and
performing the first function comprises comparing an age value of a MAC entry in the forwarding table with a timeout value supplied as a parameter in the first parameter list, and flushing the MAC entry if the age value is older than the timeout value.

35. The method of claim 1 wherein the first function changes status of a port of the network processor to a state indicated by a first parameter in the first parameter list, the port being identified by a second parameter in the first parameter list.

36. The method of claim 1 wherein the first function informs the network processor about host logical ports associated with a particular virtual LAN (VLAN) and a particular LAN emulation client (LEC), the logical ports, VLAN and LEC indicated by parameters in the first parameter list.

37. The method of claim 1 wherein the first function monitors active status of the network processor.

38. The method of claim 1 wherein the first function performs diagnostics functions on the network processor.

39. The method of claim 38 wherein the second parameter list includes a memory structure, the memory structure storing results of the diagnostics functions performed on the network processor.

40. The method of claim 1 wherein the first function queries state of an embedded simple network management protocol (SNMP) manager.

41. The method of claim 40 wherein the second parameter list includes a memory structure, the memory structure storing the queried state of the embedded SNMP manager.

42. The method of claim 1 wherein the first function sends a simple network management protocol (SNMP) protocol data unit (PDU) to a SNMP manager of the network processor, the PDU pointed to by a parameter of the first parameter list.

43. In a network environment including a host system coupled to a network processor, the host system executing a host application program, a method comprising:
providing a callback application programming interface (API) invoked by the network processor to transfer a simple network management protocol (SNMP) protocol data unit (PDU) from the network processor to the host system, the SNMP PDU to be transferred being identified by a first parameter in a parameter list associated with the callback API; and
communicating the callback API and the associated parameter list from the network processor to the host system.

44. In a network environment including a host system coupled to a network processor, the host system executing a host application program, a method comprising:
providing a callback application programming interface (API) invoked by the network processor to inform the host system of media access control (MAC) addresses learnt by the network processor; and
communicating the callback API and an associated parameter list from the network processor to the host system.

45. In a network environment including a host system coupled to a network processor, the host system executing a host application program, a method comprising:
providing a callback application programming interface (API) invoked by the network processor to inform the host system of changes to states of existing LAN emulation clients (LECs); and
communicating the callback API and an associated parameter list from the network processor to the host system.

46. In a network environment including a host system coupled to a network processor, the host system executing a host application program, a computer program product for allowing the host application to control the network processor, the computer program product comprising:
code for providing a first control program, the first control program providing a first plurality of application programming interfaces (APIs);
code for calling a first API with a first parameter list from the first plurality of APIs, the first API being invoked by the host application for performing a first function on the network processor;
code for communicating the first API and the associated first parameter list from the host system to the network processor;

code for performing the first function corresponding to the first API and the first parameter list at the network processor;

code for asynchronously invoking a callback API in response to the first API call at the network processor, the callback API including a second parameter list;

code for communicating the callback API and the associated second parameter list from the network processor to the host system; and a computer-readable storage medium that stores the codes.

47. A network system comprising:

a host system comprising a host processor and a host memory, the host memory configured to store modules for execution by the host processor, the modules including:
  a host application module executing on the host processor;
  a module for executing a first control program on the host system, the first control program providing a first plurality of application programming interfaces (APIs);
  the host application configured to call a first API with a first parameter list from the first plurality of APIs, the first API being invoked by the host application module for performing a first function on a network processor; and
  a module for communicating the first API and the associated first parameter list from the host system to the network processor; and the network processor coupled with the host system and a communication network, the network processor comprising a processor and a memory, the memory configured to store modules for execution by the processor, the modules including:
  a module for performing the first function corresponding to the first API and the first parameter list;
  a module for asynchronously invoking a callback API in response to the first API call, the callback API including a second parameter list; and
  a module for communicating the callback API and the associated second parameter list from the network processor to the host system.

* * * * *